Oct. 23, 1951 W. A. MALTHANER 2,572,740

PRIVATE BRANCH EXCHANGE TELEPHONE SYSTEM

Filed May 10, 1948 17 Sheets-Sheet 1

INVENTOR
W. A. MALTHANER
BY [signature]
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 2

INVENTOR
W. A. MALTHANER
BY
ATTORNEY

PRIVATE BRANCH EXCHANGE TELEPHONE SYSTEM

Filed May 10, 1948 17 Sheets-Sheet 3

INVENTOR
W. A. MALTHANER
BY
ATTORNEY

PRIVATE BRANCH EXCHANGE TELEPHONE SYSTEM

Filed May 10, 1948 17 Sheets-Sheet 4

INVENTOR
W. A. MALTHANER
BY [signature]
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 5

INVENTOR
W. A. MALTHANER
BY
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 6

INVENTOR
W. A. MALTHANER
BY
[signature]
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 7

INVENTOR
W. A. MALTHANER
BY
[signature]
ATTORNEY

PRIVATE BRANCH EXCHANGE TELEPHONE SYSTEM

Filed May 10, 1948 17 Sheets-Sheet 8

INVENTOR
W. A. MALTHANER
BY
[signature]
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 9

INVENTOR
W. A. MALTHANER

BY

ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 10

INVENTOR
W. A. MALTHANER
BY
[signature]
ATTORNEY

PRIVATE BRANCH EXCHANGE TELEPHONE SYSTEM

Filed May 10, 1948 17 Sheets-Sheet 11

INVENTOR
W. A. MALTHANER
BY
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 12

INVENTOR
W. A. MALTHANER
BY
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 13

INVENTOR
W. A. MALTHANER
BY
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 14

FIG. 14 TRUNK-MARKER CIRCUIT

INVENTOR
W. A. MALTHANER
BY [signature]
ATTORNEY

PRIVATE BRANCH EXCHANGE TELEPHONE SYSTEM

INVENTOR
W. A. MALTHANER
BY
ATTORNEY

PRIVATE BRANCH EXCHANGE TELEPHONE SYSTEM

Filed May 10, 1948 17 Sheets-Sheet 16

INVENTOR
W. A. MALTHANER
BY [signature]
ATTORNEY

Oct. 23, 1951 W. A. MALTHANER 2,572,740

PRIVATE BRANCH EXCHANGE TELEPHONE SYSTEM

Filed May 10, 1948 17 Sheets-Sheet 17

INVENTOR
W. A. MALTHANER
BY [signature]
ATTORNEY

Patented Oct. 23, 1951 2,572,740

UNITED STATES PATENT OFFICE 2,572,740

PRIVATE BRANCH EXCHANGE TELEPHONE SYSTEM

William A. Malthaner, Summit, N. J., assignor to Bell Telephone Laboratories, Incorporated, New York, N. Y., a corporation of New York Application May 10, 1948, Serial No. 26,028

8 Claims. (Cl. 179—18)

This invention relates to telephone systems and more especially to small-capacity private-branch-exchange systems in which the individual stations are equipped with alternating-current generating devices for causing connections to be established therewith.

In my Patent No. 2,408,433 granted to me on October 1, 1946, I disclosed a private-branch-exchange system in which a connection between a station of the private branch exchange and a trunk to a telephone central office may be established by keying, on the alternating-current device at the station, a special code followed by the number of the station. This operation establishes the connection to the central office, from which the line of the calling station may be further extended by connections within the central office. Even in the case of a dial central office, however, such extension would have to be effected with the assistance of an operator since the equipment of a dial central office is arranged to be responsive to dial impulses and not to the combinations of frequencies produced by the alternating-current device at the calling station.

It is an object of the present invention to provide means whereby the calling subscriber, having obtained a connection to a dial central office by means of the alternating-current device at his station, can himself control the extension of his connection at the central office by means of said device.

A feature of the invention is a means for converting the combination of frequencies produced by the alternating-current device at the calling station into trains of impulses corresponding to the number keyed by the calling subscriber and adapted to operate, in accordance therewith, the usual switching equipment provided at dial central offices.

Another feature of the invention is a novel form of converter for the combinations of frequencies, in which digits represented by said combinations of frequencies are registered by the charging and discharging of capacitors.

Other features of the invention, as well as its mode of operation, will be apparent from the accompanying description, the appended claims, and the drawings in which:

Fig. 1 shows two of the twenty stations for which provision is made in the present embodiment of the invention, station A having the identifying number "20" and station B having the number "39";

Figs. 2 and 3 show, diagrammatically, a cross-bar switch of well-known construction having twenty verticals and ten horizontal outlets. To each of the verticals, a station is connected in accordance with its identifying number, station A being connected to vertical No. 20, station B to vertical No. 39 and other stations being similarly connected to other verticals. Of the ten horizontal outlets, the uppermost six are reserved for three links and the lowermost four are reserved for a maximum of four trunks which may extend either to one central office or to as many as four different central offices. In the present embodiment of the invention, trunk No. 4 extends to a dial central office, indicated in Fig. 12.

Fig. 4, in the left portion thereof, shows a link-allotter circuit, while the rest of the figure, together with Fig. 5, shows the call-allotter circuit;

Figure 1:
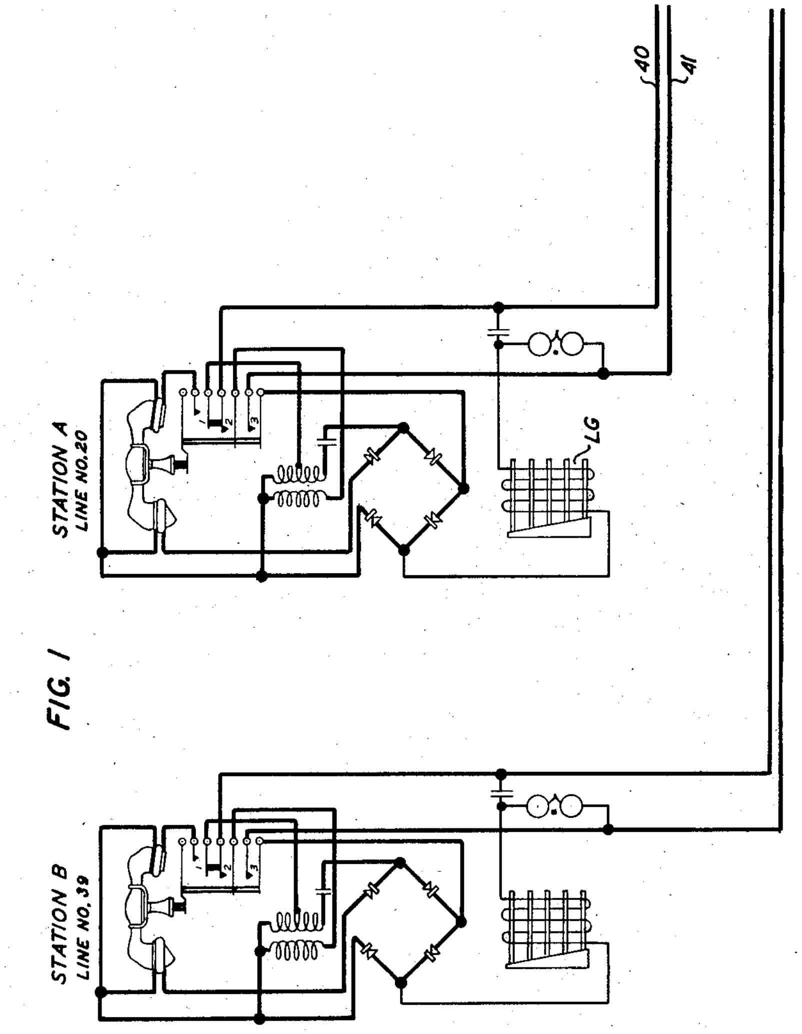
Figure 18:
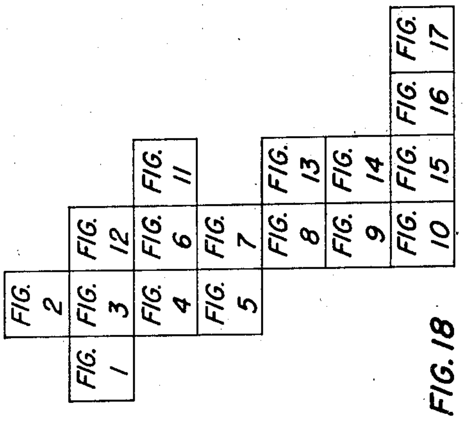
Fig. 18 shows how the above figures should be placed in relation to one another to completely disclose the invention.
Figure 2:
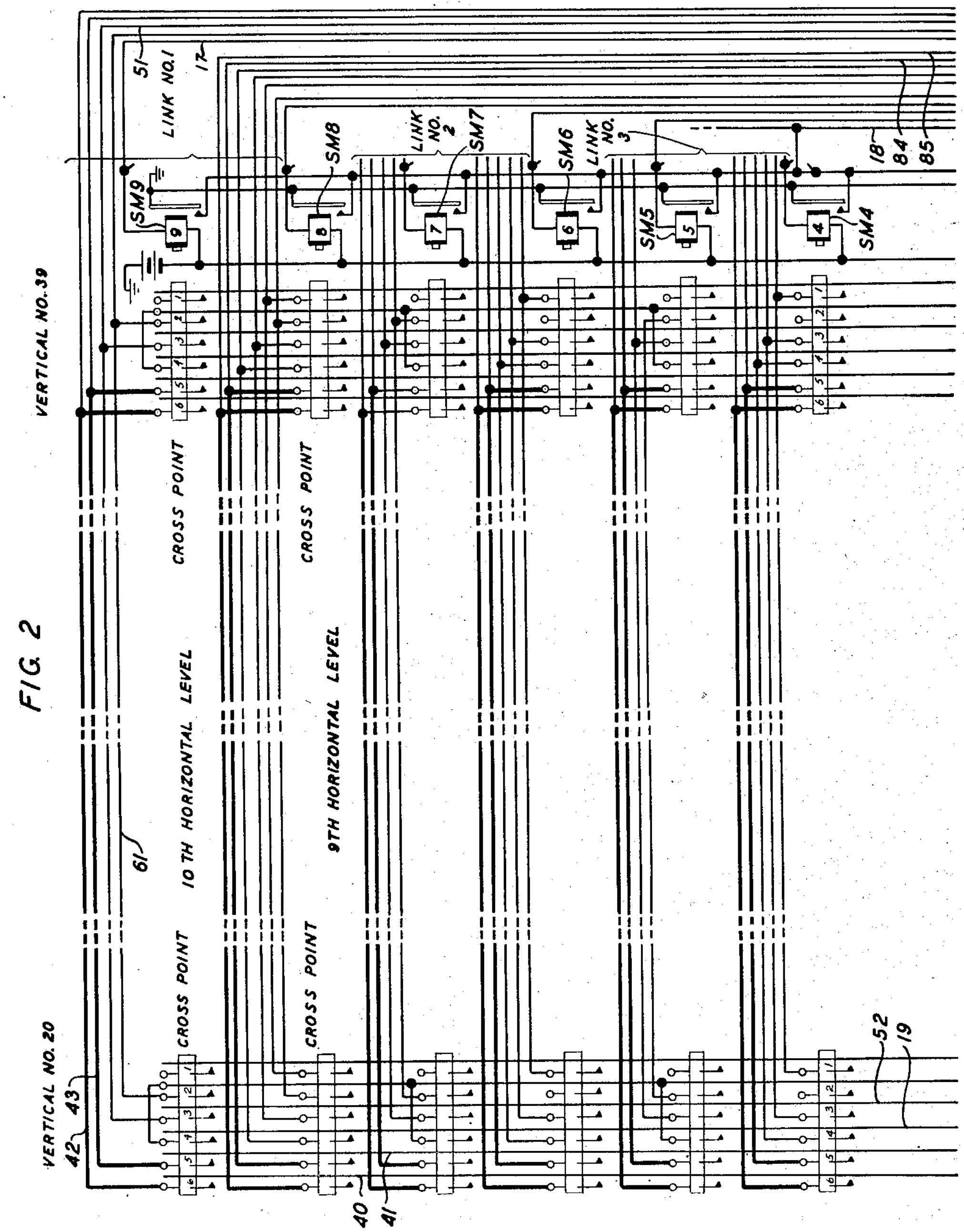
Figure 3:
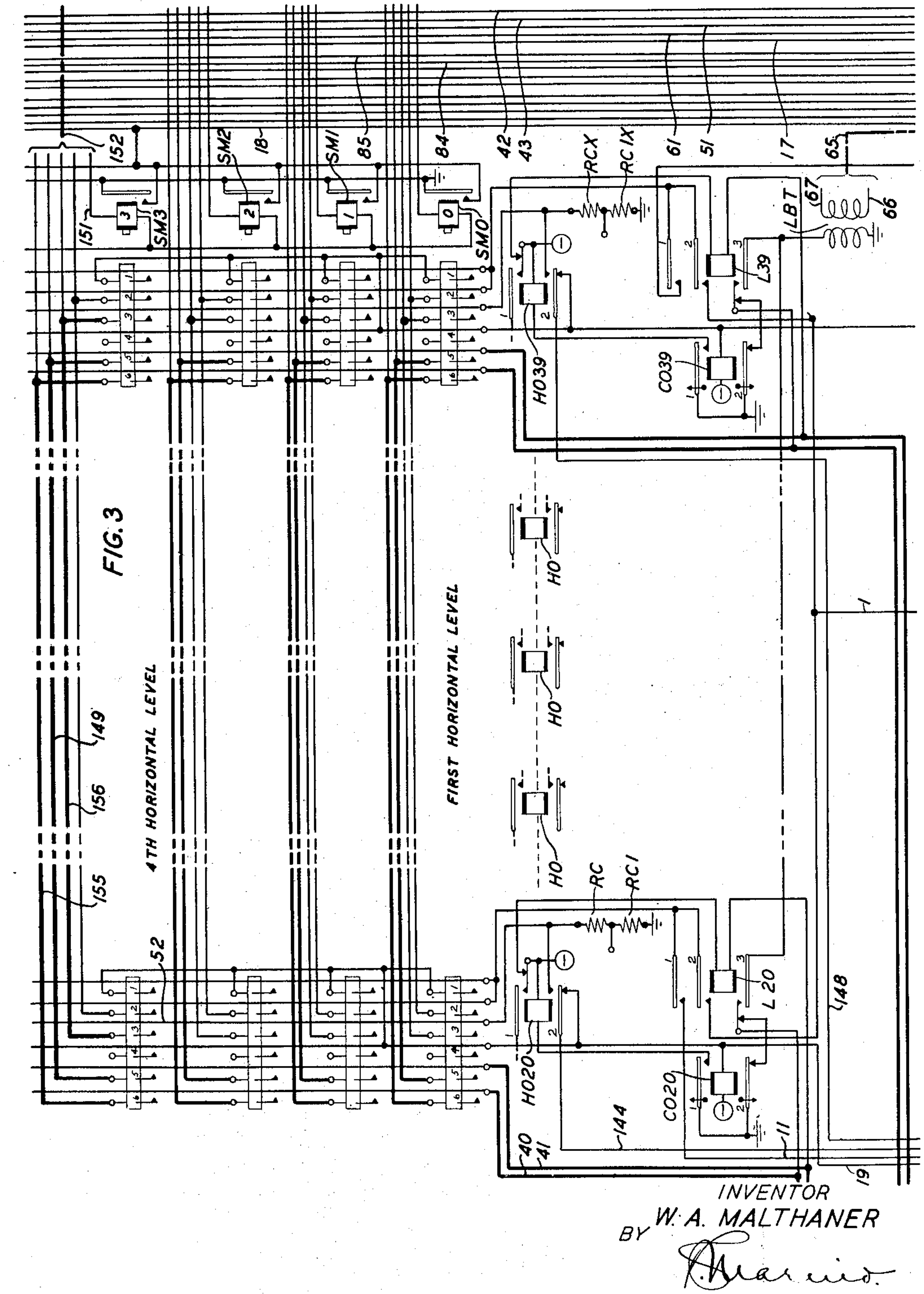

Before describing the invention in detail, attention is called to the fact that this invention is illustrated in connection with the circuits and equipment completely disclosed and described in Patent No. 2,408,433 issued to me on October 1, 1946, the equipment and circuits shown in said patent having been modified and adapted to carry out the new functions and features of the present invention, including their adaptation for cooperative action with circuits and equipment not shown therein. However, the system shown in said patent is a modification of that disclosed in my Patent No. 2,300,951 issued to me on November 3, 1941. Reference may be had to said latter patent for a description of such operations as are not pertinent to the present invention and not described herein nor in my Patent No. 2,408,433, referred to above, such, for example, as the establishment of connections between stations of the private branch exchange.

The construction and operation of the system herein disclosed are, in many respects, similar to those of the system shown in my above-mentioned Patent No. 2,408,433. The link, link allotter, call allotter, link connector, trunk marker, trunk-marker connector, and alternating-current receiver circuits are similar to and operate in a manner similar to the corresponding circuits of that patent. As in the system of the patent, when a call is originated at a station of the private branch exchange, the alternating-current receiver is connected, through the medium of one of the link circuits and the cross bar switch, to the line of the calling station and keytone transmitted to said station to advise the subscriber thereat to key the wanted number. If the calling subscriber wishes a connection to another station of the private branch exchange, he keys the number of said station on the alternating-current device at his station. The alternating-current receiver responds to the frequencies thus produced and, through the translator, operates relays to register the corresponding digits. In this case, the first digit keyed is, owing to the numbering of the station from "20" to "39," either "2" or "3" and this digit causes the link circuit to operate the cross-bar switch to connect the calling station to the station indicated by the number keyed. If, on the other hand, the calling subscriber wishes connection to a central office, he keys the special code "4" followed by the number of his own station. The registration of the digit "4" indicates to the link circuit that connection to a central office trunk is desired but before proceeding to establish such connection, a check is made that the station number keyed is actually that of the calling station and, if such is the case, to determine if the calling station is one entitled to service through the central office. Connection is established to the central office trunk, with the aid of the trunk marker, only if the check shows that the required conditions are present.

In accordance with the present invention, however, when the calling station is thus connected to the central office trunk, the alternating-current receiver and the translator are not dismissed as in the system shown in my above-mentioned patent. Instead, the converter is associated with the trunk and the calling subscriber is advised by a tone to key the number of the station with which he desires connection through the central office. When he keys said number, the alternating-current receiver responds to the combinations of frequencies produced and, through the translator, registers the corresponding digits in the converter. The converter then produces trains of impulses, similar to dial impulses, corresponding to the registered digits which are transmitted over the trunk to the central office to operate the switching equipment thereat to establish the desired connection between the calling and the called stations.

Having described the general arrangement and functioning of the invention, I will now describe in detail the operation of the present embodiment of the invention in the establishment of a connection from a station of the private branch exchange to a wanted station through a dial central office.

Figure 4:
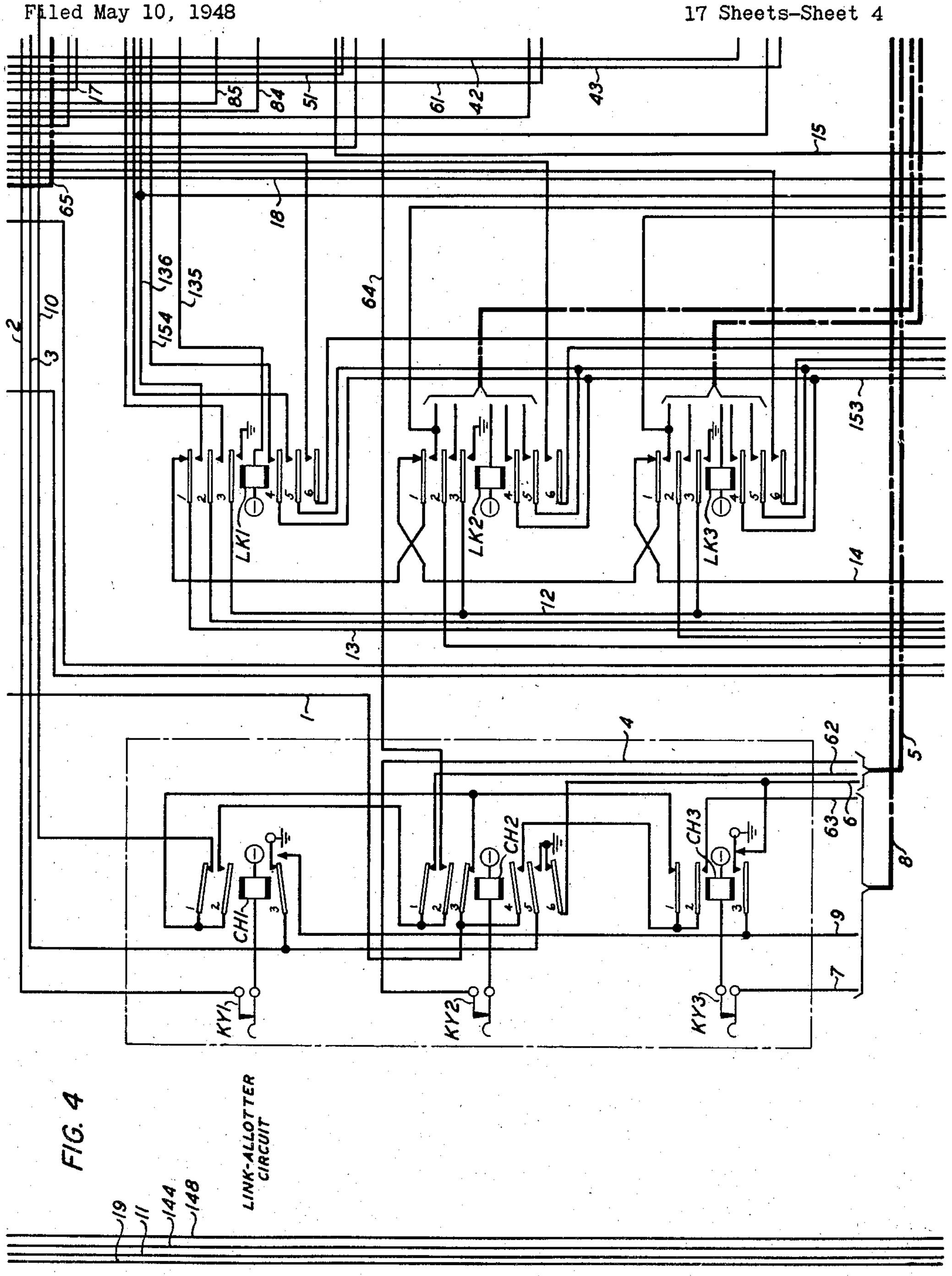
Figure 5:
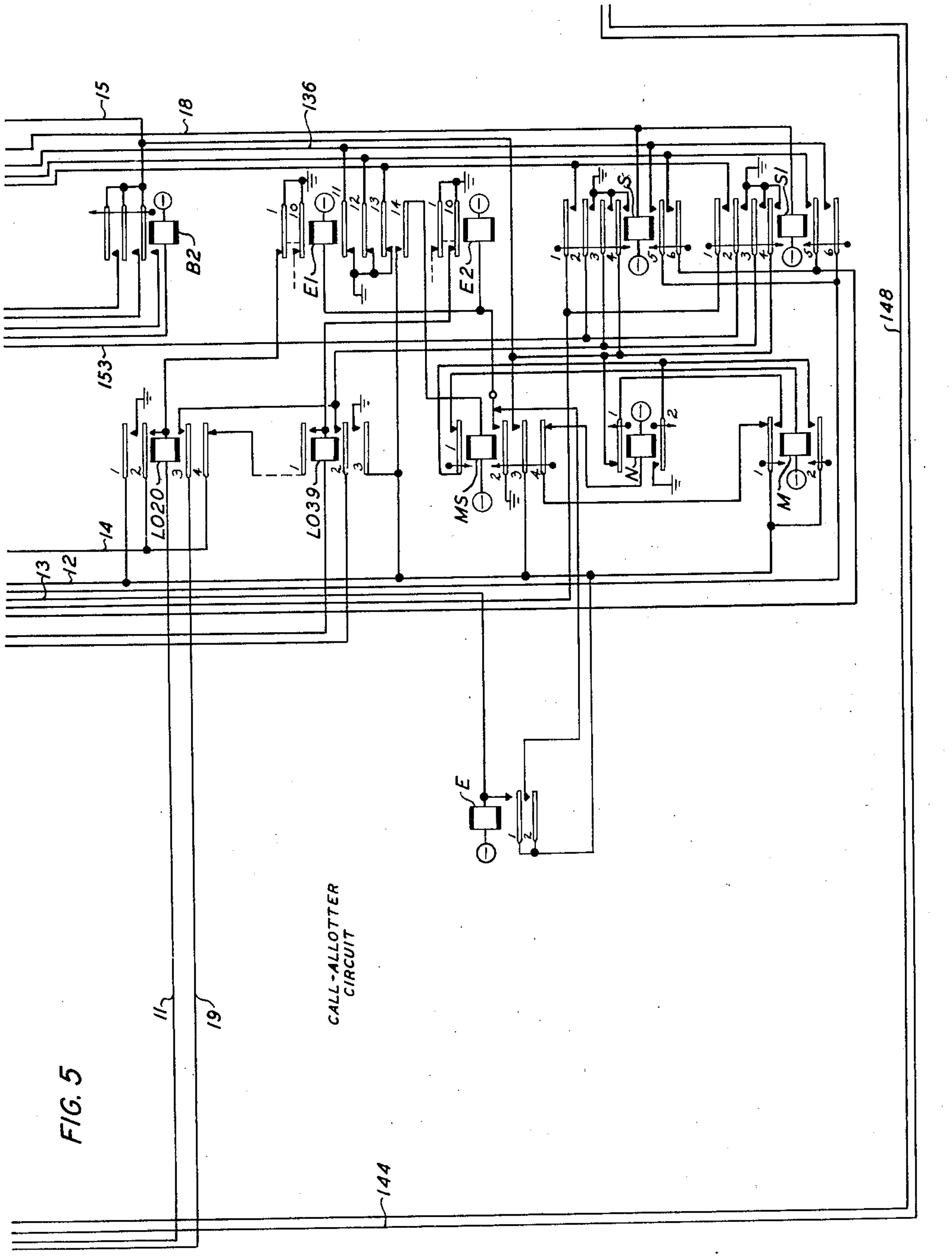
Figure 6:
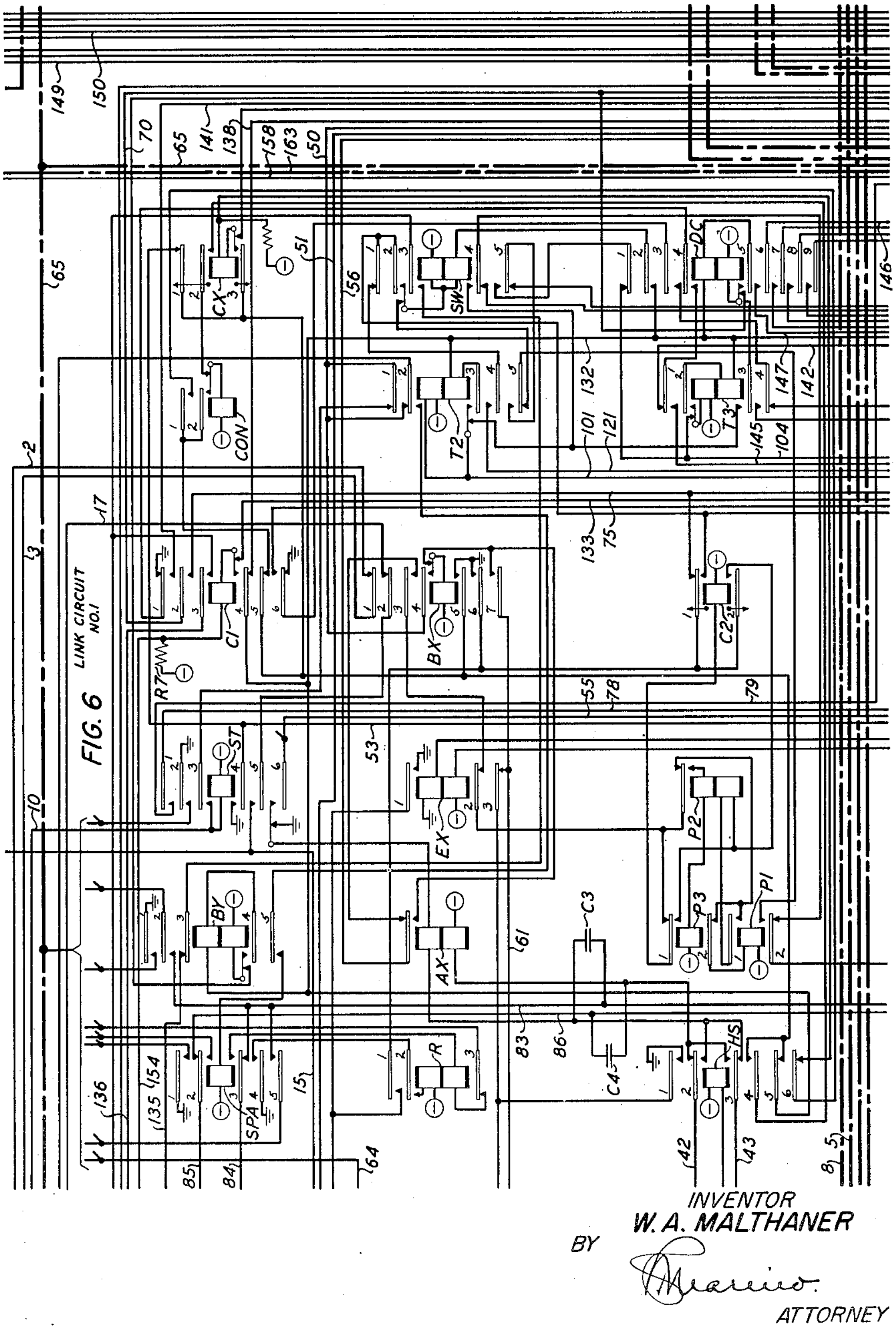
Figs. 6 and 7 show the details of link circuit No. 1.
Figure 7:
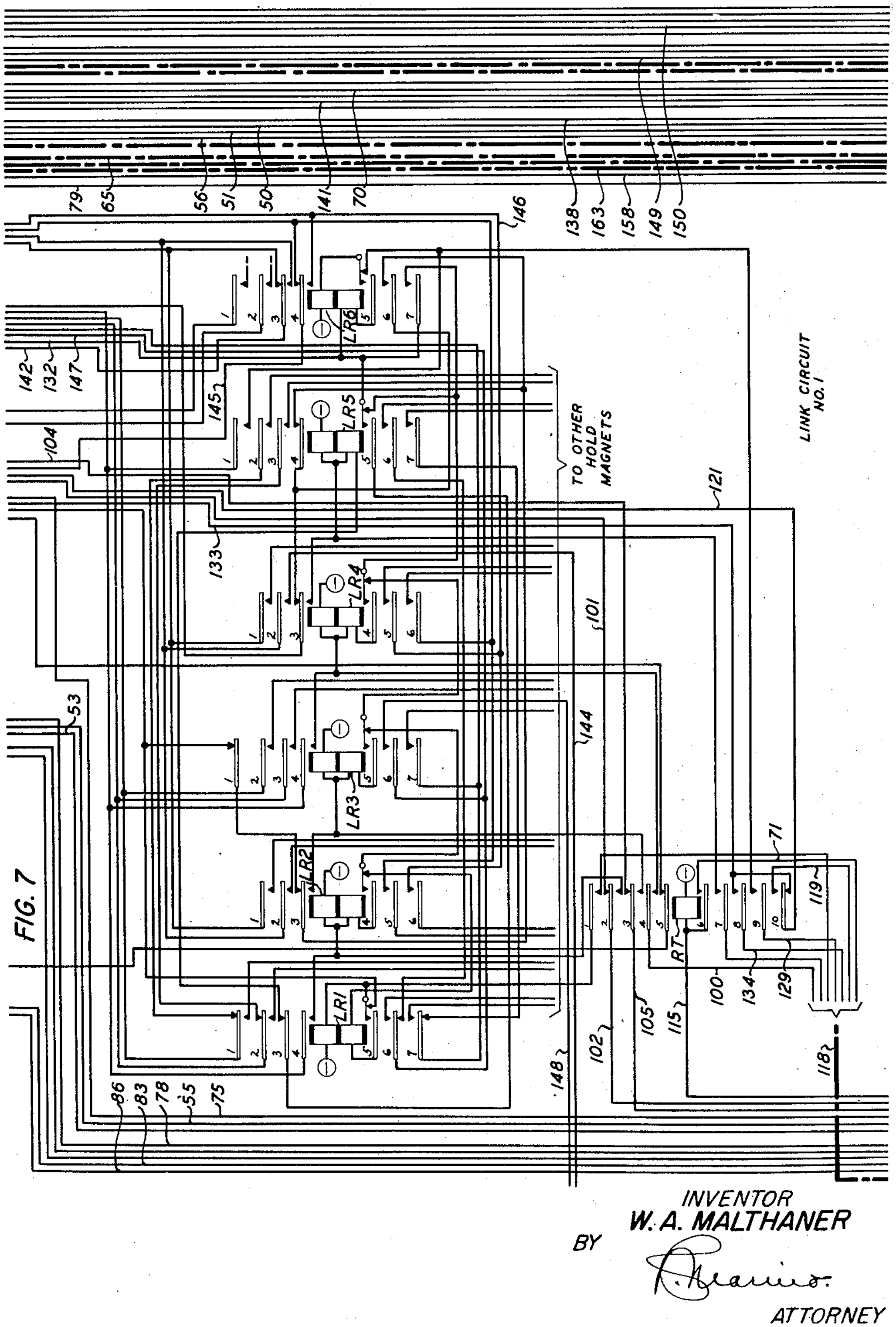
Figure 8:
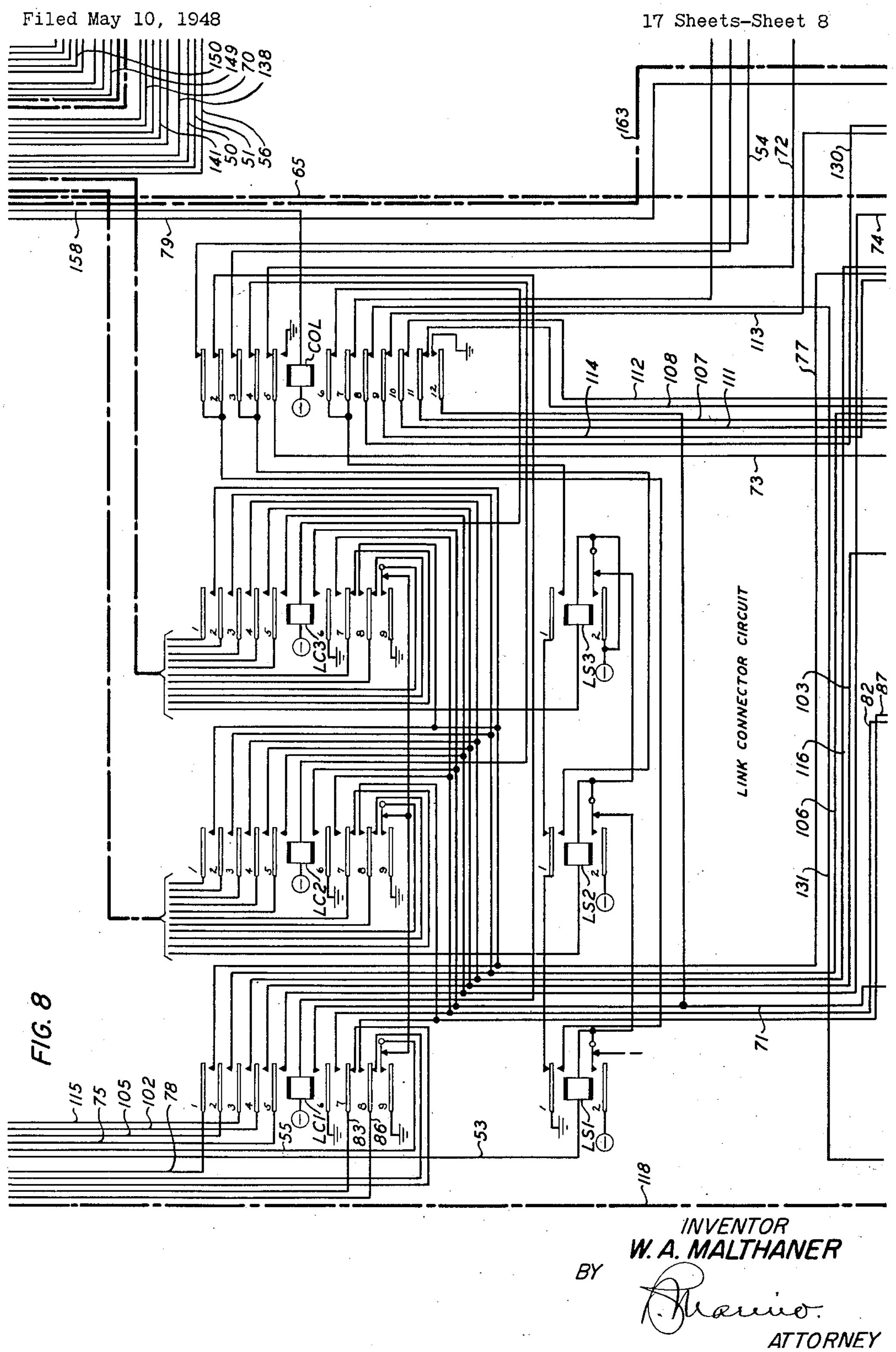
Figs. 8 and 13 show the link connector and the trunk-marker connector, respectively.

Referring to Fig. 4, there are shown therein three relays CH1, CH2 and CH3, which form a link-allotter circuit. Relays CH1 and CH2 are shown in the operated position, while relay CH3 is shown in the unoperated position. These three relays control the sequential allotment of an available link to a calling station and the functions of relays CH1 and CH2 in the positions shown is to unite the start conductor 1 to the first available link. In the present embodiment of the invention, it is assumed that the quantity of traffic from and between stations of the private branch exchange, including service to the central office, may be adequately handled by three links which I have designated links No. 1, No. 2 and No. 3. Relays CH1, CH2 and CH3 serve to allot each of said three links in rotation to calling stations. The operated condition of relays CH1 indicates that the link to which it provides access is idle and may be allotted to a calling station. Said relay remains locked in the operated condition until said link is taken into use, the locking circuit extending from battery through the winding of said relay, contacts of key KY1, conductor 2, No. 1 contacts of relay B of link No. 1 (Fig. 6), conductor 3, and No. 3 front contacts of relay CH1 to ground. Relay CH2 is also locked up over a circuit extending from battery through the winding of said relay, contacts of key KY2, conductor 4 within bracket 5, contacts of a relay (not shown) in link No. 2 similar to relay B of link No. 1, conductor 6 within bracket 5, and No. 6 contacts of relay CH2 to ground. The operating circuit of relay CH3 extends from battery through the winding of said relay, contacts of key KY3, conductor 7 within bracket 8, through contacts of a relay (not shown) in link No. 3 similar to relay B of link No. 1, and conductor 9 within bracket 8 to the No. 3 normal contacts of relay CH1 and the No. 3 front contacts of relay CH3. Both of said latter contacts being open, relay CH3 is not operated. Start conductor 1 will be seen to be extended through No. 3 contacts of relay CH2 and No. 1 contacts of relay CH1 to link No. 1. In order for a calling station to have access to link No. 1, relays CH1 and CH2 must be operated and relay CH3 not operated. It will be shown later that, as each link is allotted in rotation, the circuits of relays CH1, CH2 and CH3 are changed to extend start conductor 1 to the next idle link in order.

To make a call through the central office, the attendant at station A removes the telephone instrument from its cradle and, upon receiving "key" tone, keys upon the alternating-current generating device LG of well-known form, the digit "4" indicative of the type of connection desired, and, thereafter, the number "20" of station A. The removal of the telephone instrument from its cradle completes a circuit extending from battery through the No. 1 normal contacts of hold magnet HO20, associated with vertical No. 20, winding of relay L20, ring conductor 41, through the station loop, tip conductor 40, No. 3 normal contacts of relay L20, and No. 2 contacts of cut-off relay CO20 to ground, over which relay L20 operates. Over its No. 3 front contacts, the ground terminal of its circuit is switched from solid ground to ground through the left-hand winding of transformer LBT, to the right-hand winding of which is connected, in the event that no link is available, a source of distinctive tone, as described later.

Relay L20 completes circuits for relay LO20 of the call-allotter circuit (there being one such relay LO20 for each station) assuming relays CH1 and CH2 operated and relay CH3 not operated, and for relay ST of link No. 1, said link being, under the circumstances assumed, the preferred link for allotment. The circuit of relays LO20 and ST extends from battery through the winding of relay ST, conductor 10, No. 1 contacts of relay CH1, No. 3 contacts of relay CH2, start conductor 1, No. 2 and No. 1 contacts of relay L20, conductor 11, winding of relay LO20, and No. 1 contacts of relay E to ground. Relays LO20 and ST both operate over this circuit. Relay N then operates over a circuit extending from battery through the winding of said relay, No. 4 contacts of relay MS, No. 1 back contacts of relay M, conductor 12, and No. 1 contacts of relay LO20 to ground, completing a circuit from battery through the winding of relay M, No. 1 contacts of relay MS, and No. 2 contacts of relay N to ground, over which relay M operates, opening, at its No. 1 back contacts, the circuit of relay N, which thereupon releases. The release of relay N opens the operating circuit of relay M but the latter relay remains locked to the ground on conductor 12 under the control of the No. 1 contacts of relay MS and its own No. 2 contacts. When relay MS operates, as described later, relay M releases. This cycle of operations of relays N and M ordinarily performs no useful function but will perform an emergency function described later.

Relay E also operates over a circuit extending from battery through the winding of said relay, conductor 13, the No. 1 back contacts of the individual link relays LK1, LK2, and LK3 in series, conductor 14, No. 2 contacts of relay LO20, and No. 1 contacts of relay E1 to ground, and locks up through its own No. 1 contacts and No. 1 contacts of relay LO20 to ground, completing circuits from battery through the windings of relays E1 and E2, No. 2 normal contacts of relay MS, No. 2 contacts of relay E, and No. 1 contacts of relay LO20 to ground, over which relays E1 and E2 operate. Relay E1, in operating, opens the previously-traced operating circuit of relays LO20 and ST but said relays are now locked up over the circuit previously-traced through the winding of relay LO20, thence through No. 2 contacts of said relay, conductor 14, No. 1 contacts of relays LK3, LK2, and LK1 in series, conductor 13, No. 1 contacts of relay E, and No. 1 contacts of relay LO20 to ground. With relays E1 and E2 thus operated, no operating ground is available for any of the other relays, similar to relay LO20, associated with other stations of the private branch exchange. No other station may, therefore, receive service if a call is originated thereat, while a link is being assigned to station A.

When relay E1 operates, as described above, it completes a circuit for relay MS from battery through the winding of said relay, No. 14 contacts of relay E1, and No. 1 contacts of relay LO20 to ground. Relay MS, however, is slow operating and operates only after an interval, its No. 4 contacts then opening the operating circuit of relay N, its No. 2 contacts supplying a holding ground for relays E1 and E2, and its No. 3 contacts applying the ground on conductor 12 to conductor 15. The ground applied to conductor 15 is used to cause the operation of a link-select magnet, as later described. However, if, through some fault, relay E fails to operate, relay MS cannot operate and ground will not be supplied over conductor 15 to cause the operation of the link select magnet. Under these circumstances, it is desirable to complete the connection of station A and emergency means are provided for supplying ground to conductor 15 for that purpose. It will be remembered that when relay LO20 operated relay N operated, causing the operation of relay M. The operation of relay M caused the release of relay N but relay M remained locked up through its No. 2 contacts and No. 1 contacts of relay LO20 to ground. It will be observed that with relay M operated and relay N normal, the ground at No. 1 contacts of relay LO20 is connected through No. 1 front contacts of relay M and No. 1 contacts of relay N to conductor 15. Ground is, therefore, supplied to conductor 15 even though relays E1 and MS do not operate.

Returning now to relay ST of the allotted link No. 1, when said relay operates, as described above, a circuit is completed from battery through the winding of select magnet SM9, conductor 17, No. 2 contacts of relay B, and No. 5 contacts of relay ST, to the above-traced ground on conductor 15, over which said magnet operates, and conditions the tenth horizontal level of cross-points of the cross-bar switch for extension of the loop of the calling station A. A circuit is thereby completed from battery through the windings of relays S and S1 in parallel, conductor 18, and contacts of magnet SM9, to ground, over which said relays operate and complete a circuit from battery through the windings of cut-off relay CO20, conductor 19, No. 3 contacts of relay LO20, and No. 3 contacts of relays S and S1 to ground. Relay CO20 operates over this circuit and closes an obvious circuit for hold magnet HO20 which operates to close the cross-point at vertical No. 20 and the tenth horizontal level of the cross-bar switch in the well-known manner. The conductors 40 and 41 of station A are thereby extended to conductors 42 and 43, respectively. The operation of hold magnet HO20 opens the circuit of and releases relay LO20. The operating circuits of relays CO20 and ST are also thereby opened but relay CO20 is slow to release and holds up until a holding circuit is established for it in the link as described later. Relay ST does not release, being now locked up over a circuit extending from battery through its winding and No. 3 contacts, No. 1 contacts of relay T2, conductor 50, No. 5 normal contacts of relay MC1, conductor 51, No. 3 contacts of the closed cross-point of the cross-bar switch, conductor 52, and resistors RC and RC1 to ground.

The operation described above, of relay ST in link No. 1, completes a circuit from battery through the No. 2 normal contacts of relays LS3 and LS2 in series, winding of relay LS1, conductor 53, and No. 4 contacts of relay ST to ground, over which relay LS1 in the link-connector circuit operates. This relay is associated with link No. 1 and, as its operating battery is supplied through normal contacts of relays LS2 and LS3, associated respectively with links No. 2 and No. 3, it cannot operate until both of the latter relays are normal. The No. 2 front contacts of relay LS1 connect battery to the winding of said relay to hold it operated independently of relays LS2 and LS3. Relay LC1 then operates over a circuit extending from battery through the winding of said relay, No. 2 contacts of relay COL, and No. 1 front contacts of relay LS1 to ground. Relay MC1 of the trunk-marker connector circuit also operates over a circuit extending from battery through the winding of said relay, No. 3 contacts of relay DCT, conductor 54, No. 1 contacts of relay COL, and No. 1 front contacts of relay LS1 to ground. Relay LC1 connects link No. 1 to the translator circuit and relay MC1 connects said link to the trunk-marker circuit.

Upon the operation of relay LC1, relay ON operates over a circuit extending from battery through the winding of said relay, conductor 71, and No. 6 contacts of relay LC1 to ground. The No. 1 back contacts of relay LS1 have disconnected ground from the No. 1 contacts of relays LS2 and LS3 thereby preventing the operation of either of the relays LC2 or LC3 so that the common translator will not be connected to any other link while it is connected to link No. 1.

The cross-point at vertical No. 20 of the tenth horizontal level of the cross-bar switch being closed, as described above, the tip and ring conductors 40 and 41 of the line of station A are joined to the tip and ring conductors 42 and 43, respectively, of the link, providing a circuit path from battery through the lower winding of relay AX of the link, No. 2 back contacts of relay HS, conductor 42, No. 6 contacts of said closed cross-point, conductor 40, the loop of station A, conductor 41, No. 5 contacts of said closed cross-point, conductor 43, No. 3 back contacts of relay HS, upper winding of relay AX, No. 6 front contacts of relay ST, conductor 55, and No. 9 front contacts of relay LC1 to ground, over which relay AX operates and completes a circuit for relay BX. This circuit extends from battery through the winding and No. 4 normal contacts of relay BX, front contacts of relay AX, conductor 56, No. 5 front contacts of relay MC1, conductor 57, and No. 4 contacts of relay COK to ground. Relay BX operates and locks up through its No. 4 front contacts, conductor 50, No. 5 front contacts of relay MC1, conductor 58, No. 8 back contacts of relay NC, conductor 59, No. 6 front contacts of relay MC1, conductor 51, No. 3 contacts of the closed cross-point of the cross-bar switch, conductor 52, and resistors RC and RC1 to ground. The operation of relay BX completes a holding circuit for the cut-off relay CO20, which extends from battery through the winding of said cut-off relay, conductor 19, No. 4 and No. 2 contacts in series of the closed cross-point of the cross-bar switch, conductor 61, No. 7 contacts of relay BX, front contacts of relay AX and thence, over the operating path traced above for relay BX, to ground. The No. 2 contacts of relay BX open the circuit previously traced of select magnet SM9 and release said magnet which in turn releases relays S and S1. Relay CO20, being locked up, holds the holding magnet HO20 operated over an obvious circuit and the closed cross-points of the cross-bar switch are thereby kept closed. The No. 1 contacts of relay BX open the circuit, previously traced, of relay CH1 in the allotter circuit and release the latter relay. The start conductor 1 is thereby extended through No. 3 contacts of relay CH2, No. 2 contacts of relay CH1, No. 1 contacts of relay CH2, and conductor 62 within bracket 5, to a relay (not shown) in link No. 2 corresponding to relay ST of link No. 1.

Figure 11:
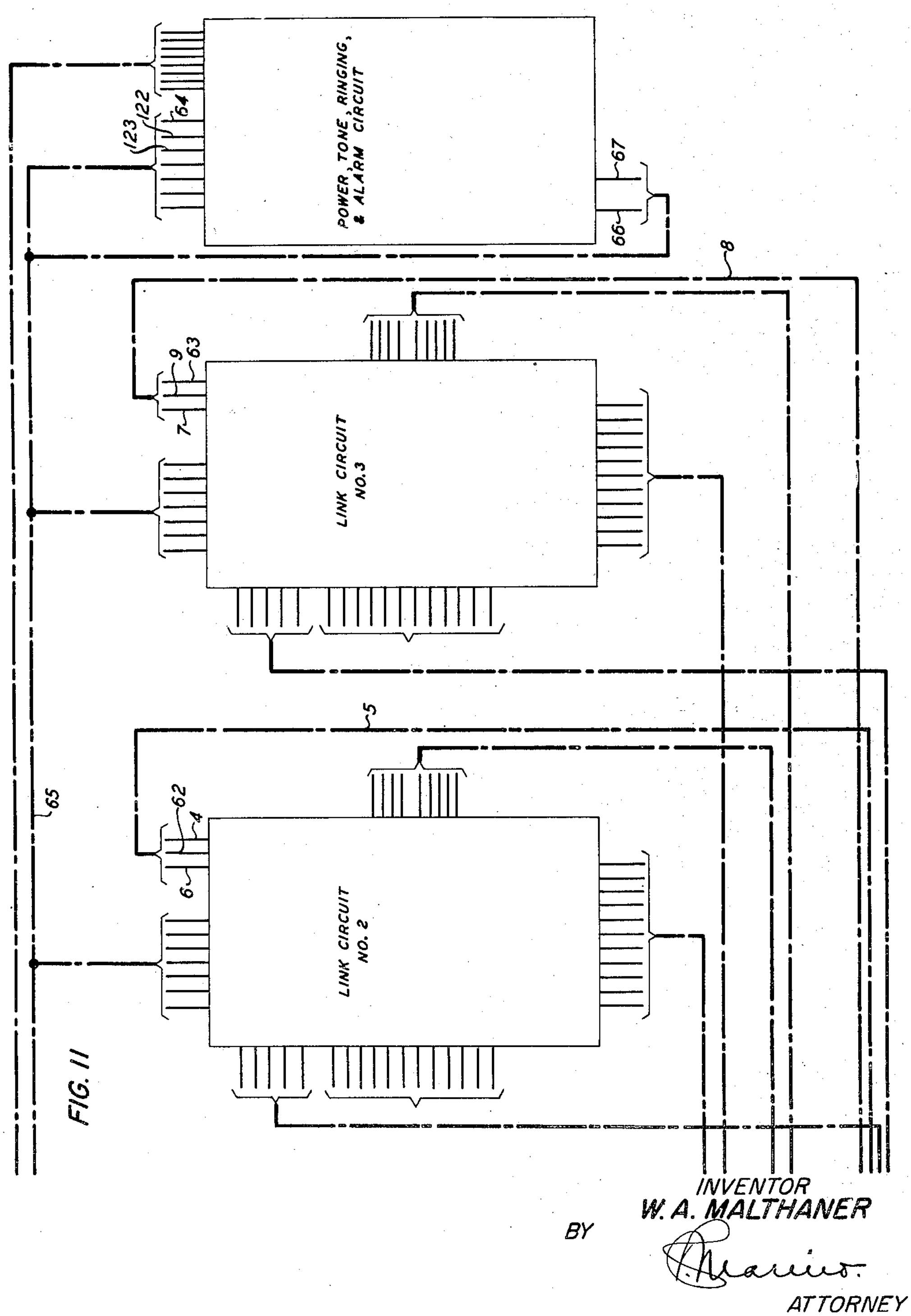
Fig. 11 shows, in diagrammatic form, two other links, and the power, tone, ringing, and alarm circuits.
Figure 12:
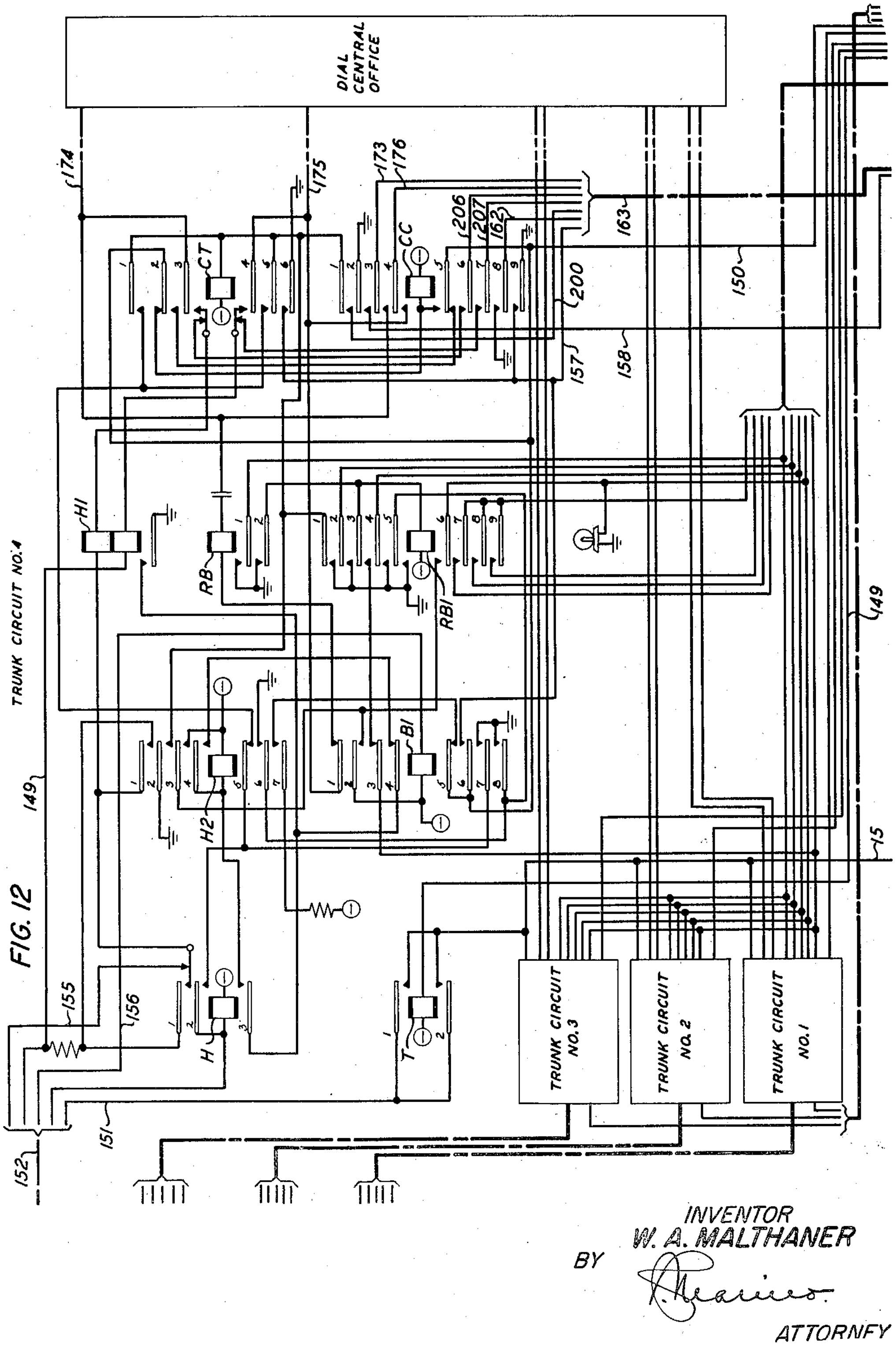
Fig. 12 shows, in detail, trunk No. 4 extending between the private branch exchange and the dial central office, the other three trunks, extending to the same central office, being conventionally indicated.
Figure 13:
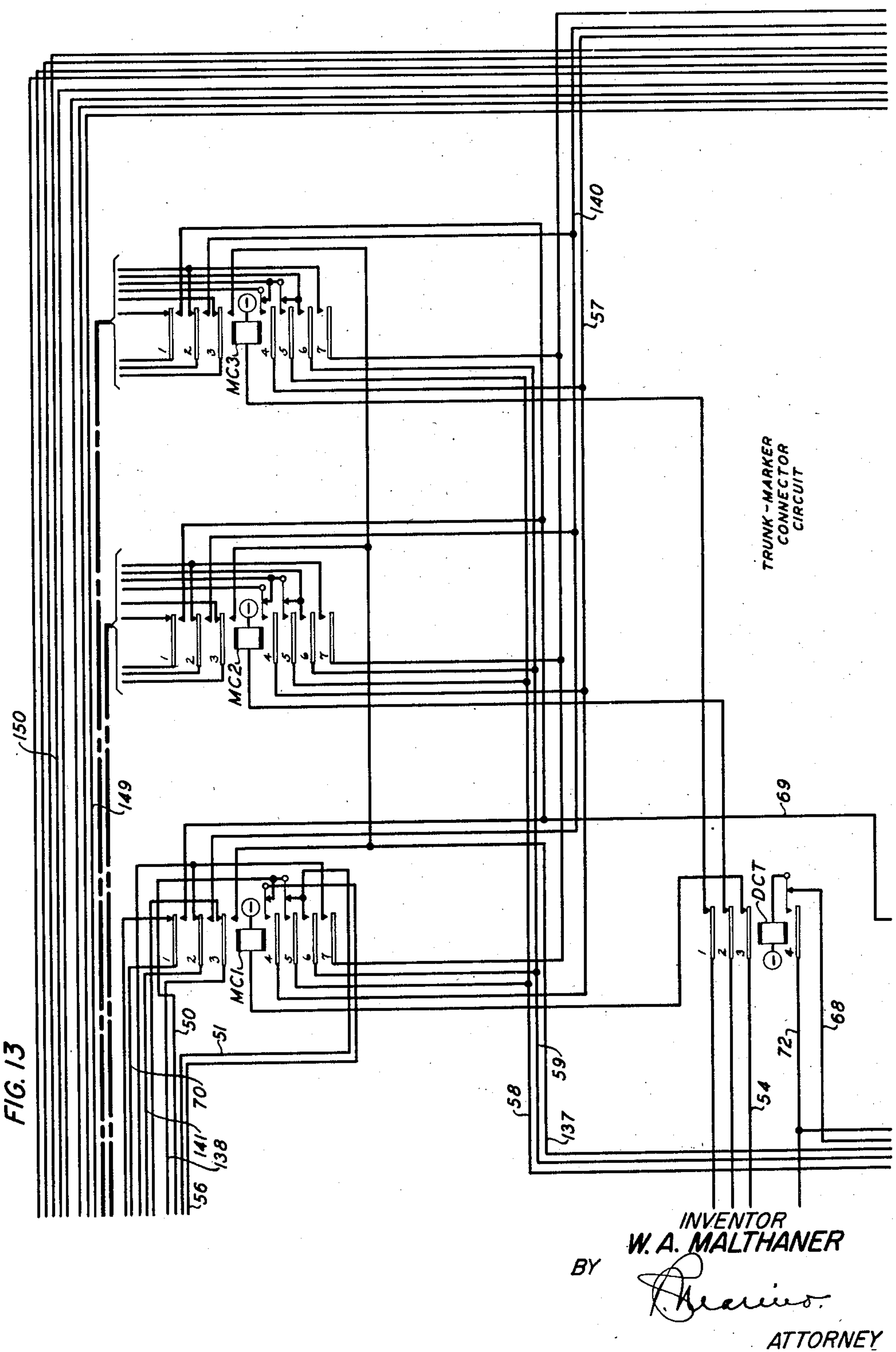
Figure 14:
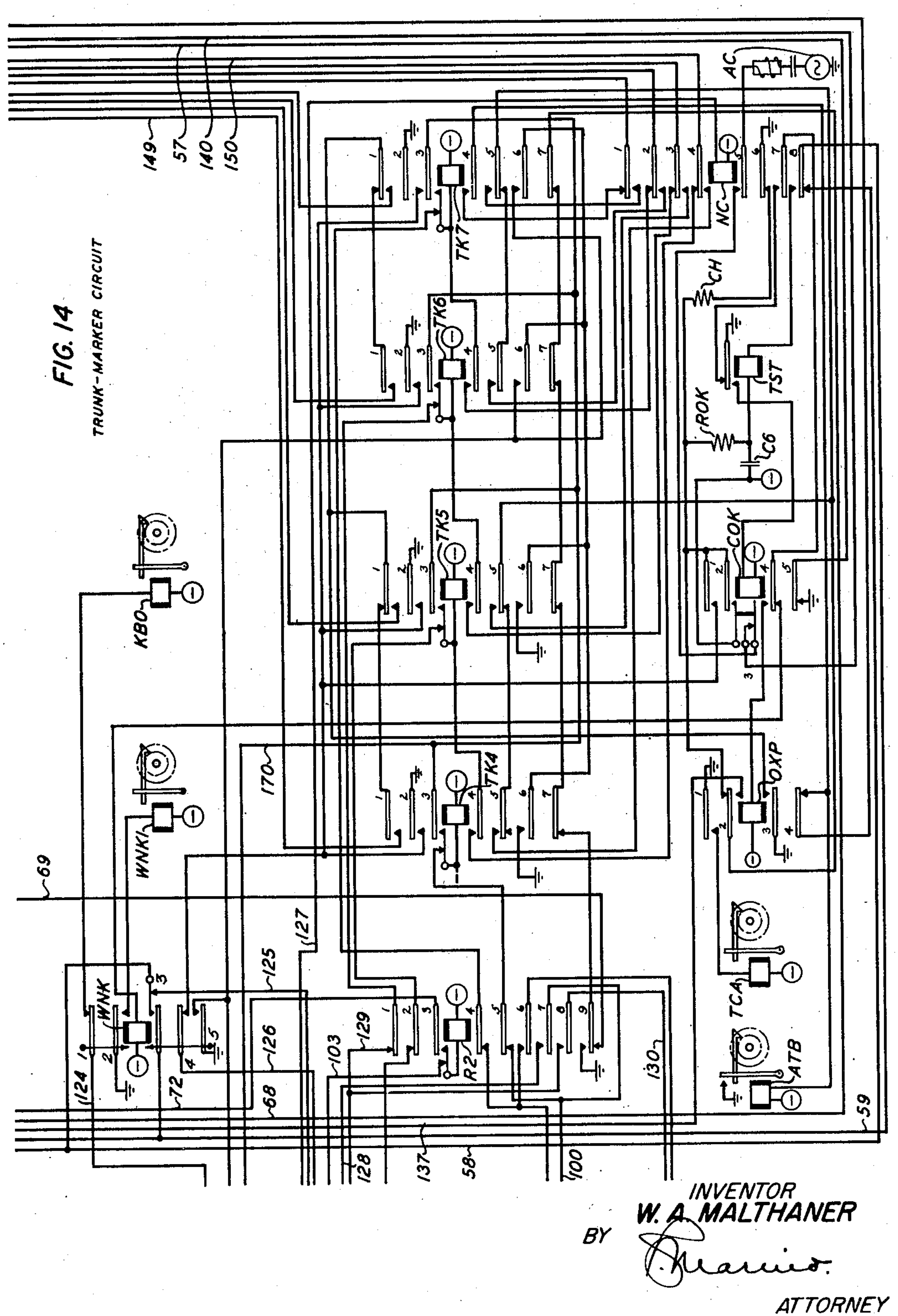
Fig. 14 shows the trunk-marker circuit.

It is now evident that if link No. 1 is busy, relay CH1 is normal and start conductor 1 is extended to link No. 2. If both of links No. 1 and No. 2 are busy, relay CH2 is also released in the manner described above for relay CH1. Relay CH3 then operates over a circuit extending from battery through the winding of said relay, contacts of key KY3, conductor 7 within bracket 8, No. 1 contacts of a relay (not shown) in link No. 3 corresponding to relay BX of link No. 1, conductor 9 within bracket 8, and No. 1 normal contacts of relay CH1 to ground. Start conductor 1 is thereby extended through No. 4 contacts of relay CH2, No. 2 contacts of relay CH3, and conductor 63 within bracket 8 to link No. 3. When link No. 3, as well as links No. 1 and No. 2, is busy, relay CH3 is also released in the manner described above for relay CH1. If, now, a call is originated at one of the stations of the private branch exchange, for example, station A, the resultant ground on start conductor 1 is extended via the No. 4 contacts of relay CH2, No. 1 contacts of relay CH3, No. 2 contacts of relay CH1, and No. 2 contacts of relay CH2 to conductor 64. This conductor extends (within bracket 65) to the power, tone, ringing, and alarm circuit, indicated but not shown in detail in Fig. 11, and said ground completes a circuit therein which causes a distinctive "link-busy tone" to be applied therefrom over conductors 66 and 67 (within bracket 65) to the right-hand coil of the transformer LBT. This tone is transmitted by induction to the left-hand winding of transformer LBT which is included in the circuit extending from battery through No. 1 normal contacts of holding magnet HO20, winding of relay L20, conductor 41, the loop of station A, conductor 40, No. 3 front contacts of relay L20, and left-hand winding of transformer LBT to ground. The subscriber at station A will, therefore, hear this tone as an indication that, due to unavailable links, his connection cannot be established.

As soon as a link, for example link No. 1, becomes available, a circuit is completed for relay CH1 from battery through the winding of said relay, thence, as previously traced, to conductor 3 and No. 5 contacts of relay CH2 to ground. Relay CH1 operates and locks to ground over its No. 3 front contacts to reestablish the circuit of start conductor 1 to the winding of relay ST of link No. 1 for seizure of said link, as described above.

Returning now to the operation of relays LC1 and MC1, described above, which connected the trunk marker to the seized link, it should be observed that the link is designed to control the setting up of two types of connections, namely, local connections between stations of the private branch exchange, and trunk connections between stations of the private branch exchange and other stations through the central office. In the case of a local connection, no trunk is required and the services of the trunk marker are not needed whereas, on a connection through the central office, the trunk marker is required to control selection of a trunk. Discrimination between the two types of connections is achieved by the first digit keyed at the calling station. For a local connection the calling subscriber keys merely the number of the desired station and, since, in the present embodiment of the invention, the numbers of the stations of the private branch exchange are from "20" to "39," the first digit keyed by the calling subscriber for a local connection is "2" or "3." As described in my above-mentioned Patent No. 2,408,433, the keying of digit "2" will cause the operation of relay T2 of the link and the keying of digit "3" will cause the operation of relay T3 followed by the operation of relay T2. The operation of relay T2 completes a circuit (as set forth in said patent) for relay C1 which, in turn, completes a circuit extending from battery through the winding and No. 4 normal contacts of relay DCT, conductor 68, serially through the No. 7 contacts of the trunk relays TK7, TK6, TK5, and TK4, No. 9 back contacts of relay R2, conductor 69, No. 1 front contacts of relay MC1, conductor 70, No. 2 contacts of relay C1, No. 1 back contacts of relay C, and No. 6 contacts of relay BX to ground. Relay DCT operates over this circuit and locks over its No. 4 front contacts, conductor 72, No. 5 back contacts of relay COL, conductor 73, and No. 6 contacts of relay ON to ground, opening, at its No. 3 contacts, the circuit of and releasing relay MC1, which disconnects the trunk marker from the link.

In the case of a connection through the central office, however, the calling subscriber keys first the trunk-designation digit "4" followed by the number of his station, which in the case of station A, is "20." Under these circumstances, relay T2 is not operated until the digit "2" is keyed and in the interval between the keying of the trunk digit "4" and said digit "2," the trunk marker remains connected to the link.

Figure 10:
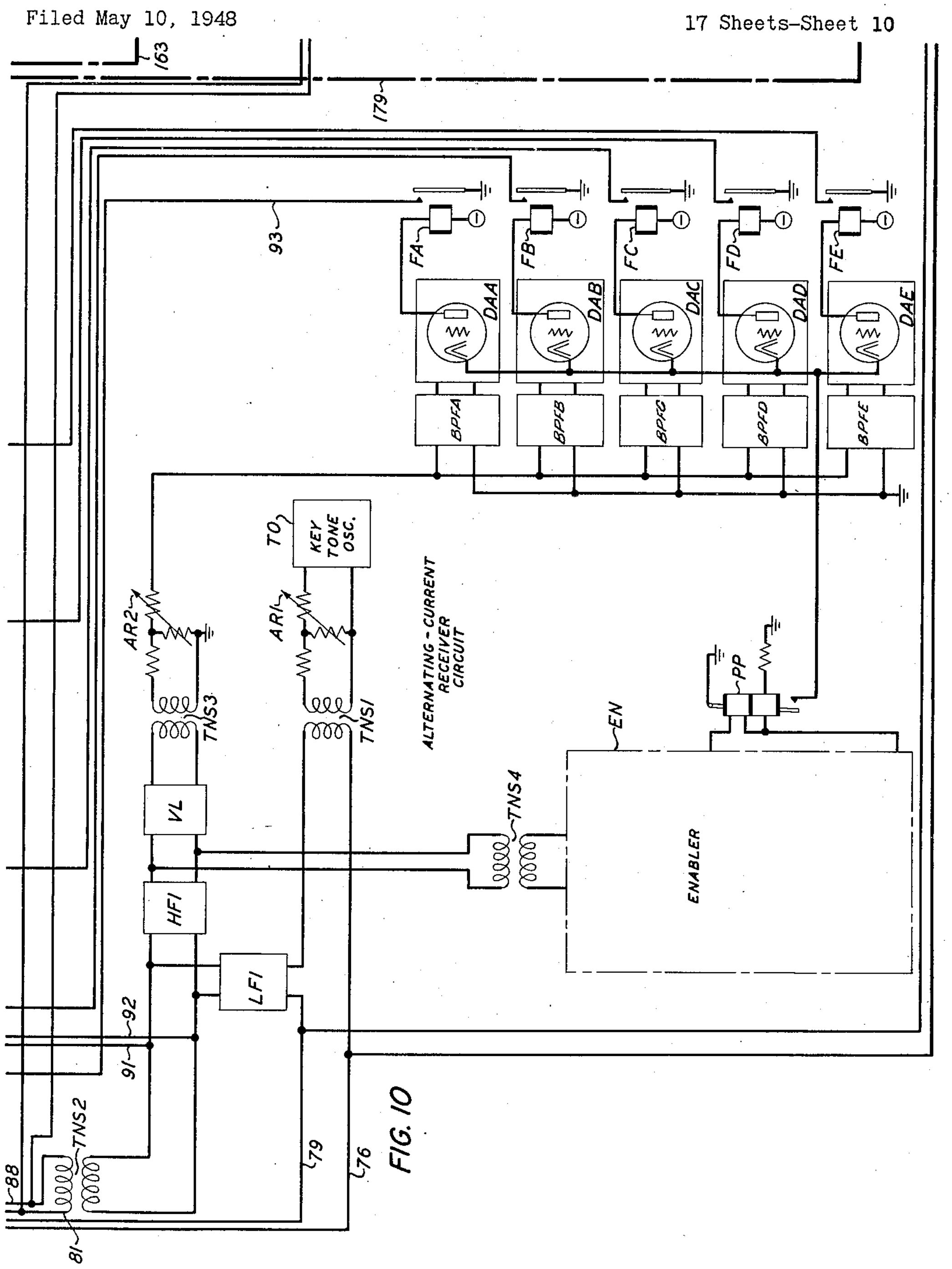

The alternating-current receiver of Fig. 10 is adapted to receive alternating-current impulses from a calling station which, as said before, is equipped with an alternating-current generating device (LG for station A) and this receiver as well as the translator and trunk marker, is connected to the link before the calling subscriber is apprised, by a suitable warning tone, to transmit signals for the desired connection. When relay ON operates as described above, a circuit is completed from battery through the winding of relay ONA, No. 1 contacts of relay HR, No. 3 normal contacts of relay ONA, conductor 74, No. 5 contacts of relay LC1, conductor 75, No. 1 back contacts of relay C, and No. 6 contacts of relay BX to ground, over which relay ONA operates. Said relay locks up through its No. 3 front contacts, conductor 71, and No. 6 contacts of relay LC1 to ground. Relay ONA closes a circuit from the lower terminal of the left-hand winding of transformer TNS1 over conductor 76, No. 2 contacts of relay ONA, No. 2 contacts of relay ON, No. 2 contacts of relay RA, No. 3 contacts of relay RR, conductor 77, No. 1 contacts of relay LC1, conductor 78, No. 1 contacts of relay ST, conductor 79, and low-pass filter LF1 to the upper terminal of the left-hand winding of transformer TNS1. Tone frequencies are supplied to the right-hand winding of transformer TNS1 by the tone oscillator TO through adjustable resistances AR1. Tone frequencies are thus induced in the circuit traced above which includes the low-pass filter LF1. By a transformer arrangement (not shown) in said low-pass filter, low frequencies are induced in the closed circuit comprising the lower winding of transformer TNS2 and high-pass filter HF1. Said high-pass filter is designed to pass only frequencies within the band of the frequencies produced by the station signal generator LG. The frequencies supplied by tone oscillator TO do not, therefore, pass into the volume limiter VL but are induced in the upper winding of transformer TNS2 and throughout a circuit extending from the left-hand terminal of said winding over conductor 81, No. 2 back contacts of relay HR, conductor 82, No. 7 front contacts of relay LC1, conductor 83, capacitor C3, No. 3 back contacts of relay HS, conductor 43, No. 5 contacts of the closed cross-point at vertical No. 20 of the tenth level of the cross-bar switch, conductor 41, the station loop of station A, conductor 40, No. 6 contacts of said closed cross-point, conductor 42, No. 2 back contacts of relay HS, capacitor C4, conductor 86, No. 8 front contacts of relay LC1, conductor 87, No. 3 back contacts of relay HR, and conductor 88 to the right-hand terminal of the upper winding of transformer TNS2. The instrument of station A being included in said circuit, the subscriber at said station hears said tone which he recognizes as the signal to proceed with the keying of the designation of the wanted connection.

Figure 9:
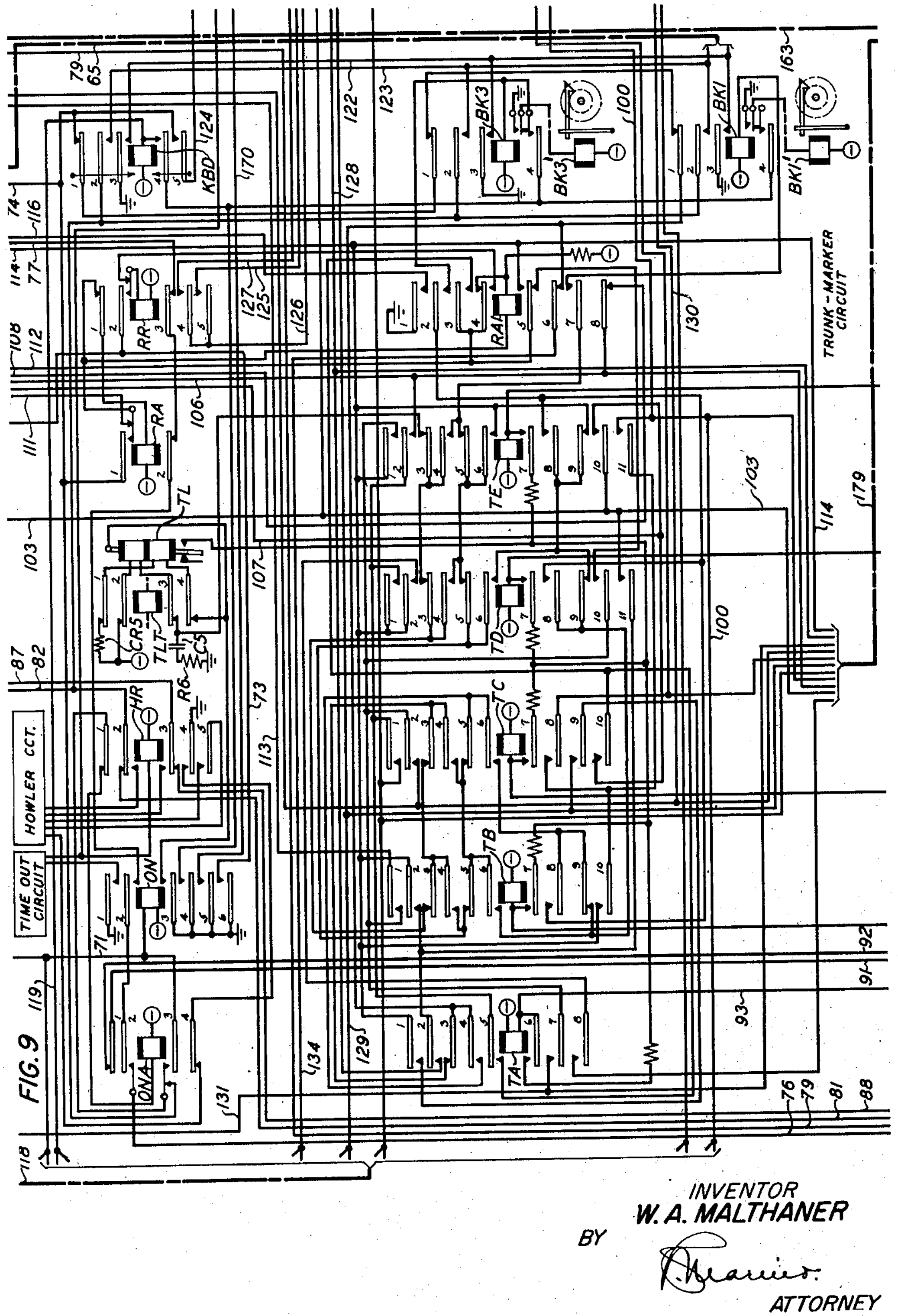
Figs. 9 and 10 show the common translator and the alternating-current receiver, respectively.

When relay ON operates, as described above, it also completes, through its No. 1 contacts, the circuit of and operates a relay (not shown) in the time-out circuit of well-known form indicated but not shown in Fig. 9. Said circuit thereupon functions to measure a time interval during which the subscriber at station A may key the wanted designation and, thereafter, to complete the circuit of and operate relay HR. If the subscriber at station A has not keyed the wanted designation before relay HR operates, it is presumed that the connection of said station to a link was due to the accidental removal of the instrument at station A from its cradle. The operation of relay HR opens the locking circuit of and releases relay ONA and the No. 5 contacts of relay HR complete the circuit of and operate a relay (not shown) in the howler circuit of well-known form indicated but not shown in Fig. 9. Said howler circuit thereupon produces a tone which is transmitted through No. 2 and No. 3 front contacts of relay HR to conductors 82 and 87 which, as traced above, extend to the loop of station A. The howler tone is thereby impressed on the receiver of said station producing a loud sound intended to attract the attention of persons near said station to restore the instrument to its cradle and thus cause the link to be disconnected from said station as later described.

Assuming, however, that relay HR has not operated, the subscriber at station A, upon hearing the key tone, operates the device LG to transmit the wanted designation. Since the connection desired is through the central office, the designation keyed comprises the trunk digit "4" followed by the number "20" of station A. This is transmitted by operating in succession, the keys of said device numbered "4," "2," and "0." The depression of each key causes two out of five reeds to be plucked according to a code combination individual to the numeral indicated, and the reeds are set into vibration to produce two alternating currents of specific frequencies which are transmitted over the circuit previously traced through the upper winding of transformer TNS2. These frequencies are induced in the circuit comprising the lower winding of said transformer and the high-pass filter HF1. Fig. 10 includes a conventional disclosure of the alternating-current receiver shown in Patent No. 2,269,022 issued on January 6, 1942, to G. Hecht and A. A. Lundstrom. It comprises the channel composed of transformer TNS2, the high-pass filter HF1, the volume limiter VL, the transformer TNS3, the adjustable resistor pad AR2, and the five detector-amplifiers DAA . . . DAE with filters BPFA . . . BPFE and associated relays FA . . . FE. Each of the filters BPFA . . . BPFE is arranged to pass only the particular frequency intended for the amplifier with which it is associated. Between the high-pass filter HF1 and the volume limiter VL is connected one winding of the transformer TNS4 the other winding of which is connected to the enabler EN. This enabler is identical with that disclosed in the above-mentioned patent and is shown only in conventional form except for the polarized relay PP. The enabler responds to a portion of the energy in each of the signal pulses that pass through the high-pass filter HF1 and functions to operate polarized relay PP after a predetermined interval. Relay PP grounds the cathodes of detector tubes DAA . . . DAE over an obvious path thereby activating said tubes to respond to signal energy through the volume limited VL. Since the operation of the enabler is fully described in the above-mentioned patent, reference is made to said patent for a complete description thereof, only so much of said description being included herein as is necessary to an understanding of the present invention.

It will be noted that the No. 1 contacts of relay ONA are bridged across the high-pass filter HF1 over conductors 91 and 92 to short circuit said filter when said relay is normal. This is a safety measure to insure that, when a call is initiated, if the No. 5 and No. 6 contacts of the cross-point of the cross-bar switch close after the alternating-current receiver is connected to the link, the impulse thereby produced over the station loop will not find passage into the high-pass filter where it might falsely operate one or more of the detectors. By the time relay ONA operates and removes the short circuit, this impulse will have dissipated.

The device LG is capable of producing five frequencies which, for convenience will be designated *f*A . . . *f*E, and that in accordance with the operation of the receiver as described in the above-mentioned patent to G. Hecht and A. A. Lundstrom, detector DAA responds only to frequency *f*A, detector DAB to frequency *f*B, etc. A contact of each of the relays FA . . . FE is connected to the winding of the corresponding one of the translator relays TA . . . TE. For example, a contact of relay FA is connected over conductor 93 to the winding of relay TA. Hence the operation of any combination of the detector-amplifiers DAA . . . DAE and the operation of the associated relays FA . . . FE will cause operation of a corresponding combination of the translator relays TA . . . TE.

The combination of frequencies for each of the digits which may be keyed at the calling station, and the corresponding combination of translator relays operated thereby through the medium of the detector-amplifiers DAA . . . DAE and relays FA . . . FE, is as follows:

| Digit Keyed | Frequencies | Translator Relays Operated |
|---|---|---|
| 1 | *f*A, *f*D | TA, TD |
| 2 | *f*B, *f*D | TB, TD |
| 3 | *f*D, *f*E | TD, TE |
| 4 | *f*B, *f*E | TB, TE |
| 5 | *f*C, *f*D | TC, TD |
| 6 | *f*A, *f*C | TA, TC |
| 7 | *f*B, *f*C | TB, TC |
| 8 | *f*C, *f*E | TC, TE |
| 9 | *f*A, *f*E | TA, TE |
| 0 | *f*A, *f*B | TA, TB |

When, therefore, the trunk digit "4" is keyed at station A, frequencies *f*B and *f*E are transmitted and, in the manner described in the above-mentioned patent to G. Hecht and A. A. Lundstrom operate detector-amplifiers DAB and DAE and, in turn, relays FB and FE. Relays TB and TE are thereby operated over obvious circuits.

Previous to the operation of relays TB and TE, the polarized relay TL operated over a circuit extending from battery through the No. 2 contacts of relay TLT, upper winding of relay TL, No. 3 contacts of relay TLT, serially through the No. 3 contacts of relays TE, TD, TB, TC, TA and No. 1 contacts of relays BK1, BK3 and KBD to the previously-traced ground on conductor 74. Relay TL also has a circuit through its lower winding extending from battery through resistor CR5, No. 1 contacts of relay TLT, lower winding of relay TL, No. 4 contacts of relay TLT, and No. 3 contacts of relay ON to ground, current in which tends to hold the armature of relay TL on its left-hand contact. The effect of this current, however, is not sufficient to prevent relay TL from operating to make its right-hand contact on the current in the upper winding of said relay in the circuit traced above. When, therefore, relays TB and TE operate as described above, they lock up through their No. 7 contacts, contacts of relay TL, and No. 3 contacts of relay ON to ground. Capacitor C5 is normally short-circuited through resistor R6 by the ground which forms part of the circuit, traced above, of the upper winding of relay TL. When relays TB and TE operate, this short-circuit is removed and capacitor C5 charges from battery through No. 2 contacts of relay TLT, upper winding of relay TL, and No. 3 contacts of relay TLT and to ground through resistor R6. The charging current, for a time, holds the right-hand contacts of relay TL closed, holding relays TB and TE operated but, as the capacitor charges and the charging current decreases, the armature of relay TL is moved to its left-hand contact by the current in the lower winding of said relay, opening the locking circuits of and releasing relays TB and TE. During the time when relays TL, TB, and TE are operated, a circuit is completed from battery through the winding and No. 3 normal contacts of relay TK4, No. 5 contacts of relay R2, conductor 100, No. 11 contacts of relay TE, No. 10 contacts of relay TB, No. 6 contacts of relay TE, No. 5 contacts of relay TD, No. 4 contacts of relay TB, No. 3 contacts of relay TC, No. 3 contacts of relay TA, No. 1 contacts of relay BK1, No. 1 contacts of relay BK3, No. 1 contacts of relay KBD, to the previously-traced ground on conductor 74. Relay TK4 operates over this circuit and locks up through its No. 3 front contacts, conductor 170 and No. 5 contacts of relay ON to ground. Relay TK4, at its No. 1 contacts, opens the circuit, previously traced, whereby key tone was supplied to station A.

The subscriber at station A now keys the number "20" of station A. The keying of the digit "2" causes the operation of translator relays TB and TD in a similar manner to that described above for relays TB and TE upon the keying of digit "4." Operation of relays TB and TD completes a circuit from battery through the upper winding of relay T2, conductor 101, No. 2 back contacts of relay RT, conductor 102, No. 4 contacts of relay LC1, conductor 103, No. 11 contacts of relay TD, No. 2 contacts of relay TB, No. 9 contacts of relay TE, No. 6 contacts of relay TD, No. 4 contacts of relay TB, No. 3 contacts of relay TC, No. 3 contacts of relay TA, No. 1 contacts of relay BK1, No. 1 contacts of relay BK3, and No. 1 contacts of relay BKD to the previously-traced ground on conductor 74. Relay T2 operates over this circuit and locks up over a circuit extending from battery through its upper winding, No. 3 front contacts, and lower winding, No. 5 contacts of relay HS, and No. 5 contacts of relay BX to ground. The No. 1 contacts of relay T2 open the locking circuit of and release relay ST. Relay LS1 is not, however, thereby released, being locked up over a circuit from conductor 53 through No. 1 contacts of relay CX and No. 5 contacts of relay BX to ground.

Had the digit keyed at station A been "3" instead of "2," translator relays TD and TE would have been operated instead of relays TB and TD. A circuit would thereby have been completed from battery through the upper winding and No. 2 normal contacts of relay T3, conductor 104, No. 3 back contacts of relay RT, conductor 105, No. 2 contacts of relay LC1, conductor 106, No. 2 contacts of relay TE, No. 1 contacts of relay TD, No. 6 contacts of relay TE, No. 4 contacts of relay TD, No. 3 contacts of relay TB, No. 3 contacts of relay TC, No. 3 contacts of relay TA, No. 1 contacts of relay BK1, No. 1 contacts of relay BK3, and No. 1 contacts of relay KBD to ground on conductor 74, operating relay T3, which locks up through its No. 2 front contacts in series with both windings, No. 5 contacts of relay HS, and No. 5 contacts of relay BX to ground. But a circuit is also completed from battery through the upper winding of relay T2, conductor 101, No. 2 back contacts of relay RT, conductor 102, No. 4 contacts of relay LC1, conductor 103, No. 10 contacts of relay TE, conductor 107, No. 11 contacts of relay COL, conductor 108, No. 8 contacts of relay RA1, No. 2 contacts of relay TE, No. 1 contacts of relay TD, No. 6 contacts of relay TE, No. 4 contacts of relay TD, No. 3 contacts of relay TB, No. 3 contacts of relay TC, No. 3 contacts of relay TA, to the aforesaid ground at No. 1 contacts of relay BK1, over which relay T2 operates and locks up as described above.

In either case therefore, whether the digit keyed at station A is "2" or "3," relay T2 is operated and a circuit is completed from battery through the winding and No. 3 normal contacts of relay R2 to the above-traced ground on conductor 103. Relay R2 operates and locks up through its No. 3 front contacts, conductor 72, No. 5 back contacts of relay COL, conductor 73, and No. 6 contacts of relay ON to ground.

When relays TB and TD operate as described above in response to the keying of the digit "2," or relays TD and TE operate in response to the keying of digit "3," a circuit is completed for relay RA which extends through contacts of relays TA . . . TE in order to insure that relay RA operates only if two and only two of relays TA . . . TE are operated. This circuit may be traced from battery through the winding of relay RA, No. 1 contacts of relay RR, No. 1 normal contacts of relay RA, conductor 111, No. 10 contacts of relay COL, conductor 112, No. 5 back contacts of relay RA1, No. 10 contacts of relay TE, thence through No. 1 contacts of relay TE or through No. 1 contacts of relay TB, conductor 113, and No. 9 contacts of relay COL, to conductor 114 and thereafter over the circuit previously traced through No. 1 contacts of relay BK1 to ground. When relays TB and TD or relays TD and TE release, relay RA remains locked up through its No. 1 front contacts to the previously-traced ground on conductor 74.

Relay RA1 now operates over a circuit extending from battery through the winding of said relay and No. 1 front contacts of relay RA to the same ground on conductor 74 and closes a circuit from battery through the winding of relay RT, conductor 115, No. 3 contacts of relay LC1, conductor 116, and No. 1 contacts of relay RA1 to ground, over which relay RT operates and locks up through its No. 6 contacts, conductor 71 within bracket 118 and No. 6 contacts of relay LC1 to ground. Relay RT connects the windings of the link register relays LR1 . . . LR6 to contacts of the translator relays TA . . . TE in order that the units digit of the station number, when keyed and registered by relays TA . . . TE, as later described, may also be registered in the link.

If the subscriber at station A should now by accident or otherwise depress the switchhook, the release of relay AX in consequence of the opening of the station loop will cause the operation of relay C2 over a circuit extending from battery through the winding of said relay, No. 1 back contacts of relay P3, No. 2 contacts of relay EX, No. 3 contacts of relay BX, back contacts of relay AX, conductor 56, No. 4 front contacts of relay MC1, conductor 57, and No. 5 contacts of relay COK to ground. Relay KBD then operates over a circuit extending from battery through the winding of said relay, conductor 119 within bracket 118, No. 10 front contacts of relay RT, conductor 121, No. 4 contacts of relay T2, No. 1 contacts of relay SW, No. 1 front contacts of relay C2, and No. 6 contacts of relay BX to ground. Through its No. 3 contacts, relay KBD applies ground over conductor 122 within bracket 65 to the power, tone, ringing, and alarm circuit causing said circuit to apply a distinctive tone to conductor 123 within bracket 65. This tone is transmitted through No. 2 contacts of relay KBD to conductor 82, thence through the station loop over the path previously traced and lower winding of relay AX to battery. This tone warns the subscriber at station A that the connection will not now be completed and that he should restore his instrument. In the event that the subscriber ignores the tone and proceeds to key the units digit of his number, said digit will not be registered, the ground employed to operate relays LR1 . . . LR6 being removed at No. 1 contacts of relay KBD. Relay KBD also completes a circuit from battery through the winding of message register KBO, No. 1 contacts of relay WNK, conductor 124, No. 5 contacts of relay KBD to the previously-traced ground on conductor 74, operating the message register which provides a record of the number of such occurrences.

Assuming, however, that the subscriber at station A does not depress his switchhook but keys the digit "O," the alternating-current receiver of Fig. 10 responds, in the manner previously described, to operate the corresponding relays FA and FB and, in consequence, relays TA and TB are operated. Relay RA1 being operated, a circuit is completed from battery through the winding and No. 2 normal contacts of relay RR, No. 4 and No. 5 front contacts of relay RA1, No. 9 contacts of relay TE, No. 9 contacts of relay TD, No. 6 contacts of relay TB, No. 5 contacts of relay TC, No. 4 contacts of relay TA, and No. 1 contacts of relay BK1 to the ground previously traced to that point, over which relay RR operates. Said relay locks up through its No. 2 front contacts to the previously-traced ground on conductor 72, opening the circuit of and releasing relay RA. Relay RR completes a holding circuit for relay BX which extends from battery through the winding and No. 4 front contacts of said relay, conductor 50, No. 5 front contacts of relay MC1, conductor 58, No. 3 normal contacts of relay WNK, conductor 125, No. 5 contacts of relay RR, conductor 126, No. 4 contacts of relay WNK, and No. 2 contacts of relay TK4 to ground. Relay RA1 does not release until the release of relays TA and TB, being held operated over a circuit extending from battery through the winding of said relay and No. 1 normal contacts of relay RA to the same ground which caused the operation of relay RR. A circuit is also completed from battery through the winding of relay NC, conductor 127, No. 4 contacts of relay RR, conductor 126, No. 4 contacts of relay WNK, and No. 2 contacts of relay TK4 to ground, over which relay NC operates.

The relays LR1 . . . LR6 of the link are operated from the translator relays TA . . . TE in combination to register the units digit of the number dialed at station A, in accordance with the following code:

| Digit | Translator Relays Operated | Link Relays Operated |
|---|---|---|
| 1 | TA, TD | LR1 |
| 2 | TB, TD | LR2 |
| 3 | TD, TE | LR3 |
| 4 | TB, TE | LR4 |
| 5 | TC, TD | LR5 |
| 6 | TA, TC | LR5, LR6 |
| 7 | TB, TC | LR1, LR6 |
| 8 | TC, TE | LR2, LR6 |
| 9 | TA, TE | LR3, LR6 |
| 0 | TA, TB | LR4, LR6 |

The operation of relays TA and TB, registering the digit "O," as described above, completes the following circuits for relay LR4 and LR6: (1) from battery through the upper winding of relay LR4, No. 4 contacts of relay RT, conductor 100 within bracket 118, No. 7 contacts of relay R2, conductor 128, No. 2 contacts of relay TA, No. 2 contacts of relay TB, No. 9 contacts of relay TE, No. 9 contacts of relay TD, No. 6 contacts of relay TB, No. 5 contacts of relay TC, No. 4 contacts of relay TA, to the previously-traced ground at No. 1 contacts of relay BK1, and (2) from battery through the upper winding and No. 5 normal contacts of relay LR6, No. 9 contacts of relay RT, conductor 129 within bracket 118, No. 8 contacts of relay R2, conductor 130, No. 8 contacts of relay COL, conductor 131, No. 7 contacts of relay TA, No. 1 contacts of relay TB, conductor 113, No. 9 contacts of relay COL, conductor 114, No. 9 contacts of relay TE and thence, over the path traced above, to ground. Relays LR4 and LR6 operate over these circuits. Relay LR4 locks up through both of its windings in series, its No. 4 front contacts, No. 5 normal contacts of relay LR5, conductor 132, No. 5 contacts of relay HS, and No. 5 contacts of relay BX to ground. Relay LR6 locks up through its upper winding, No. 5 front contacts, and lower winding, to the same ground. Any other units digit keyed at a calling station is registered in a similar manner, the circuits for operating any other combination of the relays LR1 . . . LR6 being readily traceable from the above example in conjunction with the table.

When the number of station A has been thus registered in the link, the tens digit "2" by the operation of relay T2 and the units digit "O" by the operation of relays LR4 and LR6, and relay RA1 released, the link checks or verifies the correctness of said station number before extending the station to a trunk. This is done, firstly, to prevent the disturbance of another station which may be engaged in a connection if the subscriber at station A keys the number of said other station instead of the number of station A, and, secondly, to determine whether station A is permitted access to a central-office trunk, since such access may not be permitted from certain stations of the private branch exchange. After the registration of the units digit of the calling-station number, relay C1 is operated over a circuit extending from battery through resistor R7, winding and No. 4 normal contacts of relay C1, conductor 133, No. 8 contacts of relay RT, conductor 134 within bracket 118, and No. 6 contacts of relay RA1 to the previously-traced ground at No. 1 contacts of relay BK1. Relay C1 locks up through its No. 4 front contacts, No. 5 contacts of relay HS, and No. 5 contacts of relay BX to ground. A circuit is thereby completed from battery through the lower winding and No. 5 normal contacts of relay DC, conductor 70, No. 2 contacts of relay C1, conductor 75, No. 1 back contacts of relay C2, and No. 6 contacts of relay BX to ground over which relay DC operates and locks up through its lower winding, No. 5 front contacts, and upper winding in series to previously traced ground on conductor 132. Relay SW operates over a circuit extending from battery through both windings of said relay in series and No. 2 contacts of relay DC to the same ground, completing a circuit from battery through the winding of relay LK1, conductor 135, No. 3 contacts of relay BY, No. 3 contacts of relay SW, No. 3 contacts of relay C1, conductor 136, and No. 11 contacts of relay E1 to LO20 . . . LO39 in order that if one of the latter relays has been operated in response to the initiation of a call from another station, said relay will be prevented from locking when relays E1 and E2 operate in connection with said call. The failure of the operated relay LO to lock will prevent ground from being connected through contacts of relay MS, as previously described, and thus prevent another calling station from interfering with the connection of station A to a trunk to the central office.

After the operation of relays C1 and DC, as described above, the link, with the cooperation of the trunk marker makes a check of the calling station, as indicated by the number keyed at said station, by applying an alternating current over a path which includes conductor 51 individual to the calling station. The path of this alternating current may be traced as follows: One branch extends from ground through the alternating-current source AC and impedance network in series therewith, No. 5 contacts of relay NC, No. 3 contacts of relay COK, conductor 140, No. 2 front contacts of relay MC1, conductor 141, No. 1 front contacts of relay C1, No. 4 front contacts of relay DC, No. 1 back contacts of relay T3, conductor 142, No. 3 front contacts of relay LR6, No. 2 contacts of relay LR4, conductor 144, No. 2 front contacts of hold magnet HO20, and resistors RC and RC1 to ground; a second branch extends from grounded battery through capacitor C6, winding of relay TST, No. 8 front contacts of relay NC, conductor 59, No. 6 contacts of relay MC1, conductor 51 and thence, as previously traced, through resistors RC and RC1 to ground. It will be observed that both of these paths have resistors RC and RC1 in common. These resistors are, however, in parallel, in respect to the alternating current, with the winding of relay TST, capacitor C6, and grounded battery. The quantity of alternating current which flows through the winding of relay TST will, therefore, depend upon the values of resistors RC and RC1. For stations entitled to connections through the central office, the combined value of said resistors is made high enough so that the resultant alternating current through the winding of relay TST is sufficient to operate said relay, while for stations not entitled to such service, the combined value of said resistances is made so low that insufficient alternating current flows through the winding of relay TST to operate said relay. Relay TST, therefore, operates if the calling station is arranged for service through the central office and does not operate if the calling station is not arranged for such service.

It will also be evident that relay TST will not operate if the subscriber at the calling station keys the number of some other station. For if the subscriber at station A keys, for example, the number "39" of station B, the tens digit "3" thereof will be registered by the operation and locking of relays T3 and T2 while the units "9" thereof will be registered by the operation and locking of relays LR3 and LR6. If station B is normal, with no link connected thereto, the alternating-current path from the source AC will be closed to the No. 1 front contacts of relay T3, as previously traced, thence over conductor 145, No. 4 front contacts of relay LR6, conductor 146, No. 6 contacts of relay DC, conductor 147, No. 6 contacts of relay LR3, conductor 148, No. 2 back contacts of hold magnet HO39 and winding of relay CO39 to battery. However, relay CO39 is slow to operate and is not affected by the alternating current flowing through its winding, and, therefore, does not operate to cause the operation of hold magnet HO39. The circuit through the winding of relay TST and resistors RC and RC1 remains as previously traced but is not now supplied with alternating current and, since condenser C6 prevents the flow of direct current, relay TST is not operated.

If station B is connected to one of the links, for example, link No. 2, when station A erroneously keys the number "39" of station B, relay CO39 and hold magnet HO39 are in operated condition. The path from the alternating-current source AC is now completed to ground through resistors RCX and RC1X associated with station B, which correspond to resistances RC and RC1 of station A, while the other path including the winding of relay TST is completed to ground through resistors RC and RC1, as described above. The two paths not being joined, alternating current does not flow through the winding of relay TST and said relay does not operate.

Relay TST, therefore, operates only if the calling station, station A, is arranged for service through the central office and if the number of said station is keyed thereat. When relay NC operates as previously described, a circuit is completed from battery through the winding of relay WNK, No. 4 back contacts of relay COK, No. 7 contacts of relay NC, and back contacts of relay TST to ground. Relay WNK is slow to operate, allowing time for relay TST to operate, but if the latter relay fails to operate, relay WNK operates and completes an obvious circuit for register WNK1 to register an indication that a wrong number was keyed. The No. 4 contacts of relay WNK open the circuit of and release relay NC. The locking circuit, previously traced, of relay BX is opened at the No. 3 contacts of relay WNK but these contacts, being continuity contacts, another locking circuit is immediately established over conductor 59, and No. 6 contacts of relay MC1, to the previously-traced ground on conductor 51. Relay WNK also closes an obvious circuit for relay HR which causes the application of howler tone to station A, as previously described, to warn the subscriber at said station to replace his instrument. The connection is now under the control of relay AX which, when the subscriber at station A replaces his instrument, releases and causes the disconnection of the link, translator, receiver, and trunk marker.

Assuming, however, that the correct number was keyed at station A and relay TST operated, an obvious circuit is thereby completed for relay COK which operates, completing a locking circuit for relay TST from battery through No. 2 contacts of relay COK, resistor ROK, winding of relay TST, No. 8 front contacts of relay NC, conductor 59 and thence, as previously traced, over conductor 51 and resistors RC and RC1 to ground. Relay WNK cannot now operate, its circuit being open both at back contacts of relay TST and at No. 4 back contacts of relay COK. At its No. 3 contacts, relay COK opens the previously-traced alternating-current path and at its No. 5 contacts opens the holding circuit of and releases relay CO20 which, in turn, releases hold magnet HO20, thereby opening the closed cross-point of the cross-bar switch, thus disconnecting station A from link No. 1. The holding circuits of relay TST and AX are also opened by the opening of said cross-point and said relays released but relay BX is not released, remaining locked up over a circuit extending from battery through the winding and No. 4 front contacts of said relay, conductor 50, No. 5 front contacts of relay MC1, conductor 58, No. 3 normal contacts of relay WNK, conductor 125, No. 5 contacts of relay RR, conductor 126, No. 4 contacts of relay WNK, and No. 2 contacts of relay TK4 to ground.

The release of relay TST, however, completes a circuit extending from battery through the winding of relay OXP, No. 4 front contacts of relay COK, No. 7 contacts of relay NC, and back contacts of relay TST to ground, over which relay OXP operates. Relay T of trunk circuit No. 4 then operates over a circuit extending from battery through the winding of said relay, conductor 149, No. 1 contacts of relay TK4, No. 1 back contacts of relay TK5, and No. 3 contacts of relay OXP to ground, causing the operation of select magnet SM3 over a circuit extending from battery through the winding of said magnet, conductor 151 within bracket 152, No. 1 and No. 2 contacts of relay T in parallel, to the previously-traced ground on conductor 15. Relays S and S1 thereupon reoperate (these relays operating upon the operation of any select magnet in the manner previously described) and apply ground through No. 2 contacts of both of said relays over conductor 153, No. 4 contacts of relay LK1 and conductor 154 to the junction of resistor R7 and the winding of relay C1. Said winding is thereby short-circuited and relay C1 released. Relay CO20 then operates over a circuit extending from battery through the winding of said relay, No. 2 back contacts of hold magnet HO20, conductor 144, No. 2 contacts of relay LR4, No. 3 front contacts of relay LR6, conductor 142, No. 1 back contacts of relay T3, No. 4 contacts of relay DC, and No. 1 back contacts of relay C1 to ground, closing an obvious circuit for hold magnet HO20, which operates and, in conjunction with the operated select magnet SM3, closes the cross-point of the cross-bar switch at the fourth horizontal level of vertical No. 20, thus connecting station A to trunk No. 4.

Figure 15:
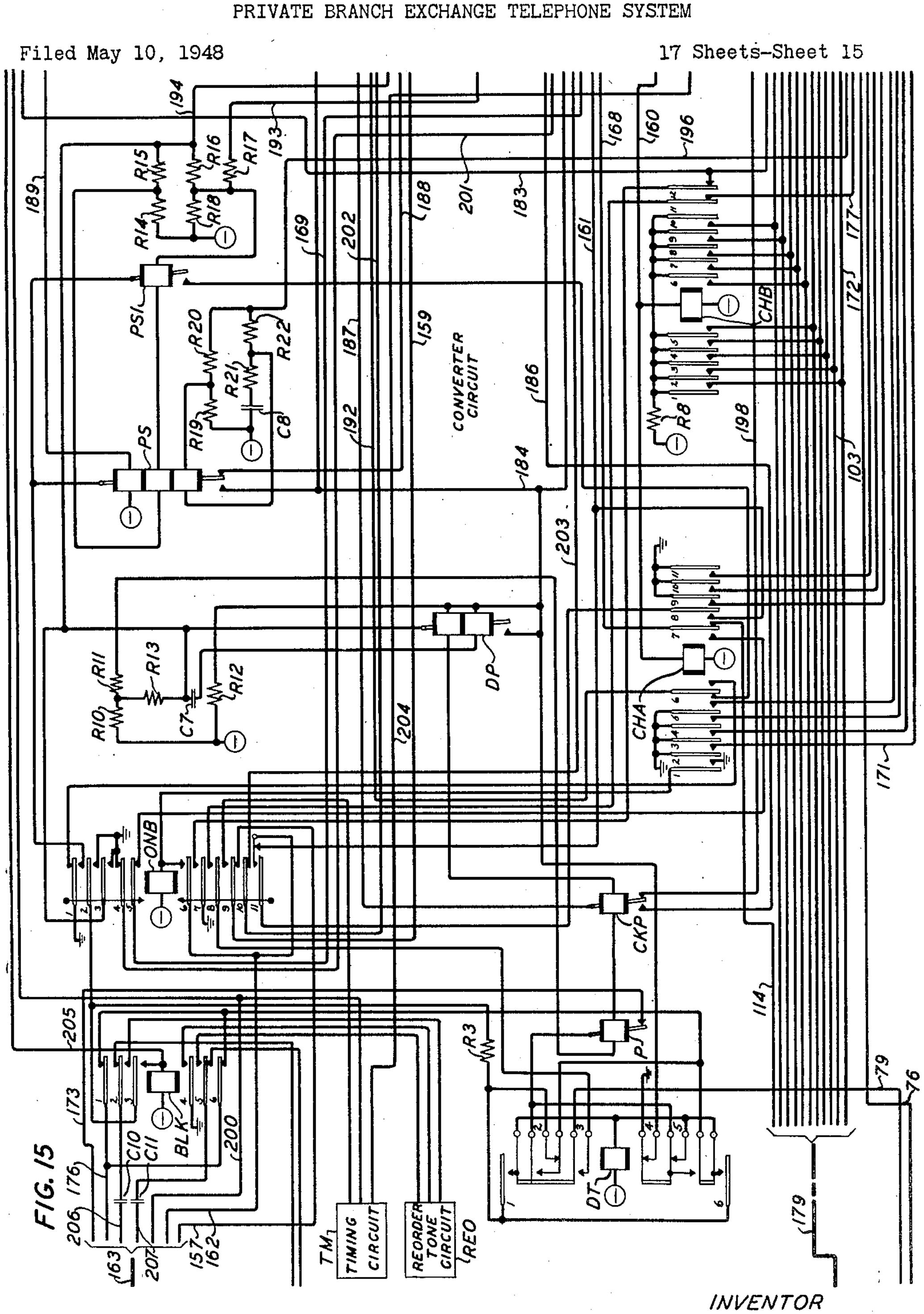
Figs. 15, 16 and 17 show the circuits of the converter.
Figure 16:
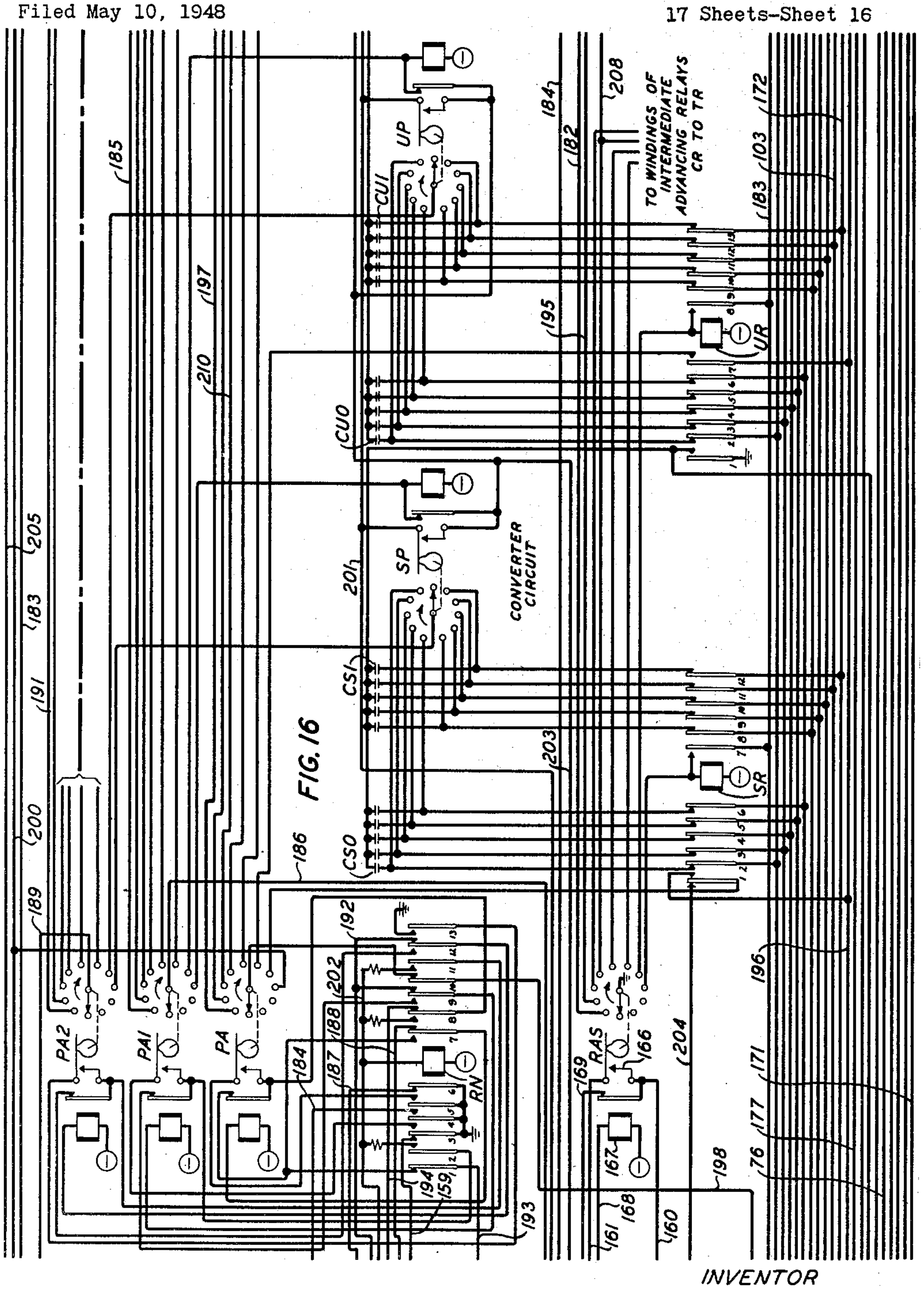
Figure 17:
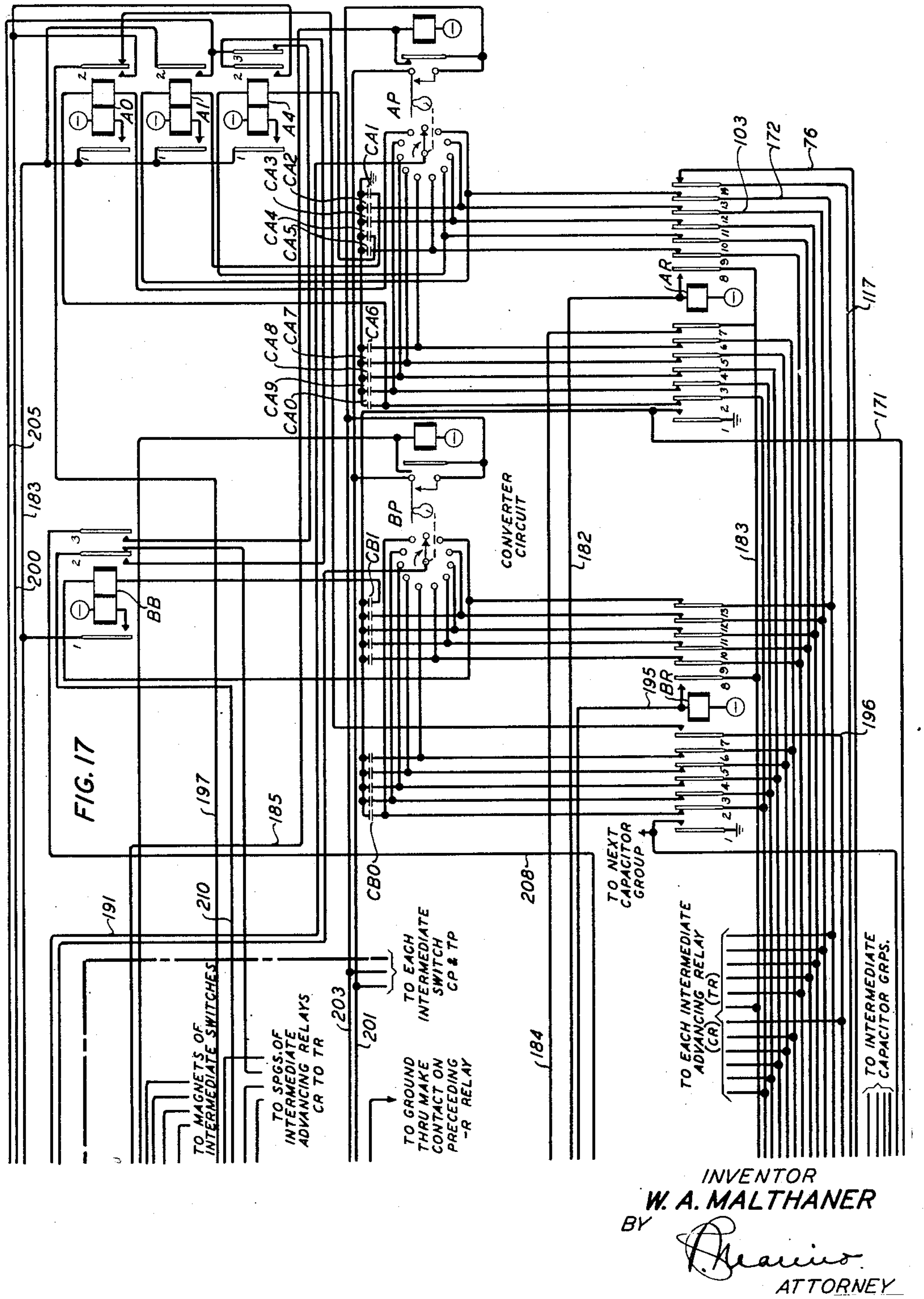

Relay B1 of said trunk operates over a circuit extending from battery through the winding of said relay, conductor 156 within bracket 152, No. 3 contacts of the closed cross-point of the cross-bar switch, conductor 52, No. 2 front contacts of hold magnet HO20, and conductor 144 to the ground traced thereto. Relay CC operates over a circuit extending from battery through the winding of said relay, No. 2 contacts of relay CT, No. 6 contacts of relay B1, conductor 157 within bracket 153, No. 9 back contacts of relay ONB (said relay being normal, the converter then being idle), conductor 159 and No. 3 back contacts of relay RN to ground and locks up through its No. 5 front contacts, conductor 150, No. 4 front contacts of relay NC, No. 5 contacts of relay TK4, No. 5 back contacts of relay TK5, No. 2 front contacts of relay OXP, conductor 137, No. 3 front contacts of relay MC1, conductor 138, No. 4 contacts of relay C1, No. 5 contacts of relay HS, and No. 5 contacts of relay BX to ground. Relay CC connects station A, through the trunk circuit to the converter circuit of Figs. 15, 16 and 17.

Upon the operation of relay CC, relay COL operates over a circuit extending from battery through the winding of said relay, conductor 158, and No. 2 contacts of relay CC to ground. At its No. 1 contacts, relay COL opens the circuit of and releases relay MC1. The No. 2 contacts of relay COL open the circuit of and release relay LC1. Relays MC1 and LC1 disconnect the trunk marker from the link. The No. 5 contacts of relay COL open the locking circuit of and release relay R2. The No. 12 contacts of relay COL provide a holding ground over conductor 71 for relays ON and ONA.

The converter circuit (Figs. 15, 16, and 17) comprises a rotary stepping switch, ten capacitors connected to the contacts thereof, and a relay for each digit of the designation of the wanted station that may be keyed at the calling station. It is assumed, in the present embodiment of the invention, that the designation keyed consists of a maximum of eight digits and eight sets of equipment are provided therefor. Switch AP, capacitors CA1 . . . CA0, and relay AR are provided for the first digit, switch BP, capacitors CB1 . . . CB0, and relay BR are provided for the second digit, switch UP, capacitors CU1 . . . CU0, and relay UP are provided for the seventh digit, and switch SP, capacitors CS1 . . . CS0, and relay SR are provided for the last digit. The equipment for the intermediate digits is not shown but is similar to the equipment shown. The converter circuit also includes other similar rotary switches. All of said switches are of the well-known magnetically-operated stay-put type. Each of said switches also has contacts operated by the switch magnet and off-normal contacts which are open when the rotor is in normal position and otherwise closed.

When the converter circuit is connected to the link, as described above, the rotor of switch RAS in the converter circuit is, as a result of previous use of said circuit, off-normal and its off-normal contacts 166 are closed. Relays CHA and CHB, therefore, operate over a circuit extending from battery through the windings of said relays in parallel, conductor 160, contacts 166, conductor 161, No. 11 normal contacts of relay ONB, conductor 162 within bracket 163, and No. 8 contacts of relay CC to ground. Relay ONB operates over an obvious circuit through No. 1 contacts of relay CHA and locks up through its No. 6 contacts to the above-traced ground on conductor 162. Relays CHA and CHB are now locked up over a circuit extending from battery through the windings of said relays in parallel, conductor 160, contacts 166, conductor 161, No. 8 contacts of relay CHA, No. 11 front contacts of relay ONB, conductor 162 within bracket 163, and No. 8 contacts of relay CC to ground. The magnet 167 of switch RAS is now included in a self-interrupting circuit extending from battery through the winding of said magnet, conductor 168, No. 7 front contacts of relay CHA, No. 5 contacts of relay ONB, conductor 169, contacts of magnet 167 and off-normal contacts 166 to the above-traced ground on conductor 161. Said magnet is, therefore, repeatedly energized and released, moving the rotor of switch RAS to the normal position, when the off-normal contacts 166 open, which arrests the action and also opens the circuits of and releases relays CHA and CHB. When relays CHA and CHB operate and before relay ONB operates, the magnet of switch PA1 is energized over a circuit extending from battery through the winding of said magnet, No. 9 back contacts of relay RN, conductor 192, No. 6 front contacts of relay CHA, and No. 1 back contacts of relay ONB to ground, and the magnet of switch PA2 is energized over a circuit extending from battery through the winding of said magnet and No. 12 back contacts of relay RN to the same ground on conductor 192. When relay ONB operates, these circuits are opened. The rotors of switches PA1 and PA2 are thereby stepped to the first off-normal terminal. Relay ONB is slow to operate to give time for the switches to operate.

It will be observed that one terminal of each of capacitors CA1 . . . CA0 is grounded. The other terminal of each of these capacitors is connected by the operation of relay CHB to battery. For example, one terminal of capacitor CA1 is connected through the right-hand winding of relay A1, No. 13 contacts of relay AR, conductor 172, No. 1 contacts of relay CHB, and resistor R8 to battery. Capacitor CA4 is similarly connected. Each of the other capacitors in this group are connected through a contact of relay AR, a contact of relay CHB, and resistor R8 to battery. When relays CHA and CHB operate, one terminal of each of capacitors CB1 . . . CB0 is connected over conductor 171 and No. 2 contacts of relay CHA to ground while the other terminal of each of said capacitors is connected to battery over circuits similar to those traced above. The other similar capacitors are similarly connected. The operation of relay CHA and CHB charges, therefore, all of the capacitors CA1 . . . CA0, CB1 . . . CB0, etc.

When relay ONB operates, ground is connected through No. 2 front contacts of said relay, resistor R3, No. 2 normal contacts of relay DT, No. 1 and No. 6 contacts of relay BLK, conductor 176 within bracket 163, and No. 4 contacts of relay CC to the ring conductor 175 to the dial central office. The tip and ring conductors 174 and 175 are connected at the dial central office to the usual subscriber's line circuit and ground on ring conductor 175 causes a sender to be connected to the line circuit at the central office in the usual manner, which grounds the tip conductor 174. Relay DT in the converter circuit then operates over a circuit completed by this ground, extending from battery through the winding and No. 5 normal contacts of said relay, contacts of relay P, conductor 173 within bracket 163, and No. 3 contacts of relay CC to said ground on conductor 174 and locks up through its No. 1 and No. 6 contacts, resistor R3, and No. 2 contacts of relay ONB to ground. The tip and ring conductors to the dial central office are now connected together. The connection may be traced from conductor 174 through No. 3 contacts of relay CC, conductor 173 within bracket 163, contacts of relay P, No. 2 front contacts of relay DT, No. 1 and No. 6 contacts of relay BLK, conductor 176 within bracket 163, and No. 4 contacts of relay CC to conductor 175. The circuit of the lefthand winding of transformer TNS1 (Fig. 10) is completed from the lower end of said winding over conductor 76, No. 14 contacts of relay AR, conductor 177, No. 11 contacts of relay CHB, No. 8 contacts of relay ONB, No. 3 contacts of relay DT, conductor 79, and filter LF1 to the upper end of the left-hand winding of transformer TNS1. Key tone is thereupon supplied through filter LF1 to transformer TNS2 and from the latter transformer, over the circuit previously traced, to station A as a signal to the party thereat to key the designation of the wanted station. When the first digit of said designation is keyed on the alternating-current generating device LG at station A, the alternating-current receiver responds in the manner previously described to operate two of the relays FA . . . FE, which, in turn, operate two of the translator relays TA . . . TE corresponding, according to the code previously given, to the digit keyed. One of the capacitors CA1 . . . CA0, corresponding to the digit dialed, is thereby discharged. For example, assume that the first digit keyed at station A is "2," operating relays TB and TD. Capacitor CA2 is thereby discharged, the terminal of said capacitor not normally connected to ground being now connected through No. 12 contacts of relay AR, conductor 103 within bracket 179, No. 11 contacts of relay TD, No. 2 contacts of relay TB, No. 9 contacts of relay TE, No. 6 contacts of relay TD, No. 4 contacts of relay TB, No. 3 contacts of relay TC, No. 3 contacts of relay TA, No. 1 contacts of relay BK1, No. 1 contacts of relay BK3, No. 1 contacts of relay KBD, conductor 74, No. 5 contacts of relay LC1, conductor 75, No. 1 back contacts of relay C2, and No. 6 contacts of relay BX to ground. The magnet 167 of switch RAS is also energized over a circuit extending from battery through the winding of said magnet, conductor 168, No. 7 back contacts of relay CHA, conductor 114 within bracket 179, No. 9 contacts of relay TE, and, thence, as traced above, to ground. When relays TB and TD are released by the operations of relay TL, as previously described, the circuit of the magnet of switch RAS is opened and said magnet released, moving the arm of said switch to the first off-normal terminal. Relay AR thereupon operates over a circuit extending from battery through the winding of said relay, conductor 182, and rotor of switch RAS to ground and locks up through its No. 8 contacts, conuductor 183, No. 12 contacts of relay CHB, and No. 7 contacts of relay ONB to ground.

Before relay AR operates, as described above, current flows from battery through resistors R10 and R11, the windings of the polarized relays P and CKP in series, the upper winding of polarized relay DP, conductor 184, No. 7 contacts of relay AR, conductor 183, No. 12 contacts of relay CHB, and No. 7 contacts of relay ONB to ground. This current keeps the contacts of relay P closed, the right-hand contacts of relay CKP closed, and the contacts of relay DP open. When relay AR operates, the ground is removed by the No. 7 contacts of said relay and current flows in the opposite direction, from battery through resistor R12, the upper winding of relay DP, the winding of relay CKP, the winding of relay P, resistors R11 and R13 in series, and No. 3 contacts of relay ONB to ground. This current opens the contacts of relay P thereby opening the connection of the tip and ring conductors 174 and 175 to the dial central office, which was previously traced through said contacts. This current also causes relay CKP to close its left-hand contacts, energizing the magnet of switch AP over a circuit extending from battery through the winding of said magnet, conductor 185, the rotor of switch PA1, conductor 186, left-hand contacts of relay CKP, conductor 187, and No. 6 contacts of relay RN to ground. Current also flows from battery through resistor R12, and the lower winding of relay DP to capacitor C7 and from said capacitor through No. 3 contacts of relay ONB to ground, to charge said capacitor. This current overcomes, for a time, the effect of the current in the upper winding of relay DP and holds the contacts of said relay open. As capacitor C7 charges, however, this current decreases until the contacts of relay DP are closed by the current through the upper winding of said relay. Ground at No. 3 contacts of relay ONB is thereby again connected to the windings of relay DP, so that the current through the windings of relays P and CKP and the upper winding of relay DP is again reversed. Relay P thereupon operates to close its contacts and relay CKP operates to close its right-hand contacts. By said operation of relay P, the tip and ring conductors 174 and 175 to the dial central office are again connected together, the opening and subsequent closing of this circuit having, at the dial central office, the same effect as a dial impulse. By said operation of relay CKP, the circuit of the magnet of switch AP is opened and the rotor of said switch thereby advanced one terminal.

When relay DP operates to close its contacts as described above, the two terminals of capacitor C7 are connected together through the contacts and lower winding of relay DP and said capacitor discharges through said winding. This, for a time, holds the contacts of relay DP closed but, as said capacitor discharges, the discharge current decreases and the contacts of relay DP are again opened by the current in the upper winding of said relay. The original condition is now restored and the operations described above are repeated, producing the effect, at the dial central office, of successive dial impulses. By suitable choice of the elements of the circuit, the timing of the operations of relay DP and, therefore, the open and closed periods of the dial central office loop, may be made the same as those produced by the usual dial. At each impulse, relay CKP is operated, as described above, controlling switch AP to advance the rotor thereof one step. During the above operations the magnet of switch PA is energized over a circuit extending from battery through the winding of said magnet, No. 7 back contact of relay RN, conductor 188, right-hand contacts of the polarized relay PS, and No. 1 front contacts of relay ONB to ground.

The middle winding of the polarized relay PS and the winding of the polarized relay PS1 are connected in series and to the bridge formed by resistors R14, R15, R16, and R18. The values of these resistors are so chosen that, with the magnet of switch PA energized, current flows from battery through resistor R18, the winding of relay PS1, the middle winding of relay PS, resistor R15, and No. 3 contacts of relay ONB to ground. The current in this circuit holds the right-hand contacts of relay PS closed and the contacts of relay PS1 open. As the rotor of switch AP is stepped by the operations of relay CKP, as described above, the upper winding of relay PS is successively connected to each of the capacitors CA1 . . . CA0. The circuit may be traced from battery through the upper winding of relay PS, conductor 189, the rotor of switch PA2, conductor 191, and the rotor of switch AP to one of the capacitors CA1 . . . CA0, the particular capacitor depending upon the position of the rotor of switch AP. All but one of the capacitors CA1 . . .CA0 are charged, as previously described. When the above connection is made to a charged capacitor, there is no material effect. When, however, the connection is made to the discharged capacitor, current flows in the above circuit to charge said capacitor. This current through the upper winding of relay PS overcomes the effect of the current in the middle winding of said relay and causes said relay to close its left-hand contacts. Since, as previously explained, the discharged capacitor of the capacitors CA1 . . . CA0 corresponds to the digit keyed at station A, the number of steps of the rotor of switch AP required to reach said capacitor is the same as the value of the digit keyed, and the operation of relay PS occurs when relay P has made that number of operations and thereby transmitted said number of dial impulses to the dial central office. By the operation of relay PS, ground at No. 1 front contacts of relay ONB is connected through left-hand contacts of relay PS to the windings of relay DP, stopping further operations of said latter relay and relays P and CKP. By the opening of the right-hand contacts of relay PS, the circuit of the magnet of switch PA is opened and said magnet releases, moving the rotor of said switch to the next terminal. The contacts of said magnet also close and resistor R17 is thereby connected in parallel with resistor R16 through conductor 193, No. 1 contacts of relay RN, contacts of the magnet of switch PA, No. 8 back contacts of relay RN, and conductor 194. The balance of the bridge formed by resistors R14, R15, R16, and R18 is thereby changed and the current flow in the winding of relay PS1 and in the middle winding of relay PS is thereby reversed, the circuit now extending from battery through resistor R14, the middle winding of relay PS, the winding of relay PS1, resistors R16 and R17 in parallel, and No. 3 contacts of relay ONB to ground. The current in this circuit holds the left-hand contacts of relay PS closed and causes relay PS1 to close its contacts. The magnets of switches PA1 and PA2 are thereby energized, the magnet of switch PA1 over a circuit extending from battery through the winding of said magnet and No. 9 back contacts of relay RN, and the magnet of switch PA2 over a circuit extending from battery through the winding of said magnet and No. 12 back contacts of relay RN, thence, for both magnets, over conductor 192, No. 6 back contacts of relay CHA, contacts of relay PS1, and No. 1 front contacts of relay ONB to ground.

When, now, a second digit is keyed at station A and registered by the operation of two of the translator relays TA . . . TE, one of the capacitors CB1 . . . CB0, corresponding to the digit dialed, is discharged and the magnet of switch RAS energized and released, moving the rotor of said switch in the same manner as described above for the first digit dialed. Relay BR then operates over a circuit extending from battery through the winding of said relay, conductor 195, and the rotor of switch RAS to ground and locks up through its No. 8 contacts, conductor 183, No. 12 contacts of relay CHB, and No. 7 contacts of relay ONB to ground. Capacitor C8 then charges from battery and through resistors R21 and R22, conductor 196, No. 7 contacts of relay BR, No. 2 back contacts of relay A0, conductor 197, the rotor of switch PA, No. 10 contacts of relay RN, conductor 198, right-hand contacts of relay CKP, conductor 187, and No. 6 contacts of relay RN to ground. The values of resistors R19, R20, R21, and R22 and capacitor C8 are so chosen that during the charging of capacitor C8, very little or no current flows through the lower winding of relay PS, the resistors and the capacitor forming a balanced bridge. When the capacitor is charged, however, current flows from battery through resistor R19, the lower winding of relay PS, and resistor R22 to the above-traced ground on conductor 196. This current overcomes the effect of the current in the middle winding of relay PS and causes said relay to close its right-hand contacts. The winding of the magnet of switch PA is thereby again energized over the circuit previously traced, opening the parallel circuit of resistors R16 and R17, thus reversing the flow of current in the middle winding of relay PS and in the winding of relay PS1. This causes relay PS1 to open its contacts and holds closed the right-hand contacts of relay PS. The circuits are thereby restored ready for the transmission of dial impulses corresponding to the second digit keyed at station A which is now represented by a discharged capacitor of the capacitors CB1 . . . CB0. The charging of capacitor C8, described above, assures a suitable inter-digital interval before the transmission of impulses for the second digit. When relay PS operates on its upper winding, as described above, the right-hand contacts of relay CKP are open and the lower winding of relay PS is therefore, not energized.

Dial impulses for the second and subsequent digits are produced in the same manner as already described for the first digit except that switch BP, with its associated capacitors, is used for the second digit and the appropriate switch for each of the other digits. When the impulses for the eighth digit have been sent out and relay PS operates to open its right-hand contacts, the magnet of switch PA is thereby released and the rotor of said switch moved to the ninth terminal. The cut-through relay CT of the trunk circuit then operates over a circuit extending from battery through the winding of said relay, No. 1 contacts of relay CC, conductor 200 within bracket 163, the rotor of switch PA, No. 10 contacts of relay RN, conductor 198, right-hand contacts of relay CKP, conductor 187, and No. 6 contacts of relay RN to ground and locks up through its No. 1 and No. 5 contacts, No. 5 contacts of relay H2, and No. 7 contacts of relay B1 to ground, opening the circuit of and releasing relay CC. The circuit of relay ONB is thereby opened and said relay released, which releases relay DT and relays AR, BR . . . UR, SR. Any of the stepping switches (except switch RAS) which are off normal now return to normal. For example, the magnet of switch SP is included in a self-interrupting circuit extending from battery through the winding and contacts of said magnet, the off-normal contacts of said switch, conductor 201, and No. 4 contacts of relay ONB to ground, which returns the rotor to normal. Switches AP, BP, etc. are similarly returned to normal. Relay RN operates over a circuit extending from battery through the winding of said relay, conductor 202, No. 10 contacts of relay ONB, conductor 203, the off-normal contacts of any of the switches AP, BP, etc. which are off normal, conductor 201, and No. 4 contacts of relay ONB to ground. Relay RN locks up through its No. 2, No. 5 front, or No. 8 front contacts, off-normal contacts of switch PA, PA1, or PA2, and its own No. 3, No. 5, or No. 13 contacts to ground. Relay RN, therefore, remains operated so long as any of the switches (except switch RAS) is off normal. The magnets of switches PA, PA1 and PA2 are thereby included in self-interrupting circuits which may be traced as follows: from battery through the winding of the magnet of switch PA, No. 7 front contacts of relay RN, contacts of said magnet, off-normal contacts of switch PA, and No. 5 contacts of relay RN to ground; from battery through the winding of the magnet of switch PA1, No. 9 front contacts of relay RN, the contacts of said magnet, off-normal contacts of switch PA1 and No. 3 front contacts of relay RN to ground; and from battery through the winding of the magnet of switch PA2, No. 12 front contacts of relay RN, the contacts of said magnet, the off-normal contacts of switch PA2, and No. 13 contacts of relay RN to ground. When all of the switches (except switch RAS) have returned to normal, their off-normal contacts are open and relay RN is thereby released. So long as relay RN is operated, ground is removed from conductor 159 at the No. 3 back contacts of said relay and the converter circuit cannot be seized for another call. When relay RN releases, the converter circuit is normal and ready for another call.

Release of relay CC removes ground from conductor 158, releasing relay COL, which releases the trunk-marker circuit. Operation of relay CT connects conductor 40 from station A through No. 6 contacts of the fourth horizontal level on vertical No. 20 of the cross-bar switch, conductor 155 within bracket 152, No. 1 normal contacts of relay H, upper winding of relay H1, and No. 3 front contacts of relay CT to conductor 174 to the dial central office and connects conductor 41 from station A through No. 5 contacts of the fourth horizontal level of vertical No. 20 of the cross-bar switch, conductor 149 within bracket 152, lower winding of relay H1, and No. 4 front contacts of relay CT to conductor 175 to the dial central office. Connection of station A through the dial central office to the called station may now be made in the usual manner, the wanted number having been transmitted, as described above, to the sender at the dial central office.

The above description assumes that eight digits of the wanted number were keyed at station A. In many cases, the designation of a wanted station comprises only seven digits. When the seventh digit has been keyed at station A, and the corresponding impulses transmitted to the dial central office, the rotor of switch PA is on the seventh terminal of said switch. Ground is then supplied through No. 6 contacts of relay RN, conductor 187, right-hand contacts of relay CKP, conductor 198, No. 10 contacts of relay RN, the rotor of switch PA, No. 1 back contacts of relay SR, and conductor 204 to the timing circuit TM, of any suitable well-known form, which is thereby activated. If, at the end of a predetermined interval, relay CKP is not operated in connection with the transmission of an eighth digit to open this circuit, the timing circuit TM grounds conductor 200, operating relay CT to dismiss the converter circuit and cut station A through to the dial central office, as described above.

The foregoing description also assumes that the digits keyed at station A were those designating a wanted station. Commonly, however, connections are made to telephone operators by dialing special codes. Provision has been made, therefore, in the present embodiment of the invention, as described below, for cutting the calling station through to the dial central office if the first digit keyed at the station is "0" or the first three digits are "411." Provision has also been made to block the call, as described below, if the first digit keyed is "1" or if the first digit keyed is any digit other than "0," "1," or "4" and the next two digits keyed are "11." It is assumed that these represent codes that would be keyed at a calling station only in error.

When the capacitors CA1 . . . CA0 are charged, as previously described, by the operation of relay CHB which connects battery to the appropriate conductors, such as conductor 172, the charging current passes through the right-hand windings of relays A0, A1, and A4, momentarily operating said relays. Similarly, when capacitors CB1 . . . CB0 are charged, relay BB is momentarily operated. These momentary operations have, however, no material effect. But if the first digit keyed at the calling station is "1," the capacitor discharged, in the manner previously described by grounding conductor 172 to register said digit, is capacitor CA1. The discharge current from said capacitor then passes through the right-hand winding of relay A1, and No. 13 contacts of relay AR to said ground on conductor 172, operating relay A1. At this time, relay CHB is not operated and relay A1 locks up over a circuit extending from battery through the left-hand winding and No. 1 contacts of said relay, conductor 183, No. 12 contacts of relay CHB, and No. 7 contacts of relay ONB to ground, operating relay BLK over a circuit extending from battery through the winding of said relay, conductor 205, and No. 2 contacts of relay A1 to said ground on conductor 183. Relay BLK locks up through its No. 3 contacts and No. 2 contacts of relay ONB to ground. The No. 4 contacts of relay BLK apply ground to the reorder circuit REO, of any suitable well-known form, which then connects a suitable tone over the circuit extending from said reorder circuit through No. 2 front contacts of relay BLK, capacitor C10, conductor 206 within bracket 163, No. 6 contacts of relay CC, No. 3 normal contacts of relay CT, thence over the circuit previously traced through the loop of station A and through No. 4 normal contacts of relay CT, No. 7 contacts of relay CC, conductor 207 within bracket 163, capacitor C11, and No. 5 front contacts of relay BLK to the reorder circuit. This tone is audible at station A as a signal to restore the instrument at said station and place the call again.

If the first digit keyed at the calling station is any digit other than "0," "1," or "4," none of the relays A0, A1, and A4 is locked up and the digit keyed is transmitted to the dial central office as already described. However, if the second digit keyed is "1," relay BB is operated by the discharge of capacitor CB1 and locks up in the same way as described above for relay A1. Thereafter, when the rotor of switch RAS reaches the fourth terminal of said switch for the transmission of the fourth digit, relay BLK operates over a circuit extending from battery through the winding of said relay, conductor 205, No. 3 contacts of relay A4, No. 3 contacts of relay BB, conductor 208, and the rotor of switch RAS to ground, blocking the call and sending tone to the calling station, as described above.

However, if the first digit keyed at the calling station is "4," relay A4 is operated by the discharge of capacitor CA4 and locks up in the same way as described for relay A1. If the next digit keyed at Station A is "1," relay BB operates and locks up as described above. Then when the rotor of switch PA is on the third terminal of said switch for the transmission of the third digit and relay CKP closes its right-hand contacts after the transmission of one impulse, relay CT operates over a circuit extending from battery through the winding of said relay, No. 1 contacts of relay CC, conductor 200 with bracket 163, No. 2 contacts of relay A4, No. 2 front contacts of relay BB, conductor 210, the rotor of switch PA, No. 10 contacts of relay RN, conductor 198, right-hand contacts of relay CKP, conductor 187, and No. 6 contacts of relay RN to ground, and cuts the calling station through to the dial central office, as previously described.

If the first digit keyed is "0," relay A0 is operated by the discharge of capacitor CA0 at the end of the transmission to the dial central office of that digit and locks up in the same way as described above for relay A1. Relay CT then operates over a circuit extending from battery through the winding of said relay, No. 1 contacts of relay CC, conductor 200 within bracket 163, No. 2 front contacts of relay A0, conductor 197, the rotor of switch PA, No. 10 contacts of relay RN, conductor 198, right-hand contacts of relay CKP, conductor 187, and No. 6 contacts of relay RN to ground, and cuts the calling station through to the dial central office, as previously described.

What is claimed is:

1. In a telephone system, a plurality of stations each having an alternating-current signaling device, a plurality of trunks, means responsive to a signal from the signaling device at one of said stations for selecting one of said trunks, means for verifying the identity of said station, means operative in response to the verification of the identity of said station by said last-mentioned means and responsive to other signals from said signaling device for transmitting over said trunk direct-current impulses corresponding to said signals, and means for thereafter connecting said station to said trunk.

2. In a telephone system, a plurality of stations each having an alternating-current signaling device, a plurality of trunks, means responsive to a signal from the signaling device at one of said stations for selecting one of said trunks, a plurality of capacitors, means for charging said capacitors, means responsive to another signal from said signaling device for selectively discharging one of said capacitors in a manner indicative of said other signal, means operative to produce and transmit direct-current impulses over said trunk, and a check circuit for said last-mentioned means operative to cause the transmission of an impulse over said trunk for each of certain of said undischarged capacitors and said discharged capacitor, said circuit including means operative over a path completed through said discharged capacitor for arresting the transmission of further impulses over said trunk.

3. In a telephone system, in combination, means for producing a succession of alternating-current signals, each of said signals representing the value of a digit, means including a register successively settable in response to each of said signals, a plurality of groups of capacitors, each of said groups of capacitors containing a capacitor for each value of a digit, means for charging all capacitors in all of said groups, means responsive to each setting of said register for discharging in one of said groups of capacitors the one capacitor therein which indicates the value of the digit represented by the setting of said register, means operative to produce and transmit direct-current impulses, and means operative over a path completed through each of said discharge capacitors in succession for controlling said last-mentioned means to produce successive groups of direct-current impulses, each of said groups of direct-current impulses containing as many direct-current impulses as indicated by the digital representation of the discharged capacitor through which said path is completed.

4. In a telephone system, an identifiable station having an alternating-current signaling device, means responsive to a first group of signals from said signaling device indicative of the identity of said station for verifying said identity, means responsive to a second group of signals from said signaling device for producing direct-current impulses corresponding to said second group of signals, and means for preventing the production of said direct-current impulses when said first group of signals does not correspond to the identity of said station.

5. In a telephone system, a plurality of stations each having an alternating-current signaling device, some of said stations being entitled to trunking service and others not entitled to such service, circuit means individual to each station for distinguishing a station entitled to trunking service from a station not entitled to such service, a plurality of trunks, means responsive to the signaling device at one of said stations for selecting one of said trunks, means responsive to signals from said signaling device for transmitting over said trunk direct-current impulses corresponding to said signals, means for thereafter connecting said station to said trunk, and means operative over said circuit means individual to said station for preventing the production of dial impulses and the connection of said station to said trunk if said station is one not entitled to trunking service.

6. In a telephone system, a station having an alternating-current signaling device, a trunk, means responsive to signals from said signaling device for transmitting over said trunk direct-current impulses corresponding to said signals, means for thereafter connecting said station to said trunk, and means responsive to other signals from said signaling device for preventing the connection of said station to said trunk.

7. In a telephone system, a plurality of stations each having an alternating-current signaling device, a plurality of trunks, means responsive to signals from the signaling device at one of said stations for connecting said station to another of said stations, means responsive to other signals from the signaling device at another of said stations for selecting one of said trunks, means responsive to signals from the signaling device at said other station for which a trunk is selected for transmitting over said trunk direct-current impulses corresponding to said signals, and means for thereafter connecting said other station to said trunk.

8. In a telephone system, a plurality of identifiable stations having an alternating-current signaling device, some of said stations being entitled to trunking service and others not being entitled to such service, means responsive to signals from the signaling device at a first one of said stations for connecting said first station to another of said stations, a plurality of trunks, means responsive to other signals from the signaling device at a second of said stations for selecting one of said trunks, means responsive to signals from the signaling device at a said second station for which a trunk is selected for transmitting over said trunk direct-current impulses corresponding to said signals, means for thereafter connecting said second station to said trunk, means responsive to signals from the signaling device at said second station indicative of the identity of said second station for verifying said identity, means responsive to said verifying means for preventing the transmission of direct-current impulses and the connection of said second station to said trunk, and means responsive to certain predetermined signals from the signaling device at said second station for preventing the transmission of direct-current impulses and the connection of said second station to said trunk.

WILLIAM A. MALTHANER.

REFERENCES CITED

The following references are of record in the file of this patent:

UNITED STATES PATENTS

| Number | Name | Date |
|---|---|---|
| 2,317,191 | Holbrook | Apr. 20, 1943 |
| 2,326,457 | Hadfield | Aug. 10, 1943 |
| 2,351,684 | Jansson | June 20, 1944 |